（12）United States Patent
Kishimoto

(10) Patent No.: US 11,582,232 B2
(45) Date of Patent: Feb. 14, 2023

(54) AUTHORITY TRANSFER SYSTEM, SERVER AND METHOD OF CONTROLLING THE SERVER, AND STORAGE MEDIUM

(71) Applicant: CANON KABUSHIKI KAISHA, Tokyo (JP)

(72) Inventor: Ryo Kishimoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 171 days.

(21) Appl. No.: 17/087,129

(22) Filed: Nov. 2, 2020

(65) Prior Publication Data
US 2021/0144138 A1  May 13, 2021

(30) Foreign Application Priority Data
Nov. 7, 2019 (JP) .............................. JP2019-202619

(51) Int. Cl.
*H04L 29/06* (2006.01)
*H04L 9/40* (2022.01)
*H04L 9/32* (2006.01)

(52) U.S. Cl.
CPC ........ *H04L 63/0876* (2013.01); *H04L 9/3213* (2013.01); *H04L 63/108* (2013.01); *H04L 63/20* (2013.01)

(58) Field of Classification Search
None
See application file for complete search history.

(56) References Cited

U.S. PATENT DOCUMENTS

2013/0070288 A1\* 3/2013 Muranaka .............. G06F 3/1204
358/1.15
2016/0253666 A1\* 9/2016 Lee ..................... G06Q 20/3574
705/72
2018/0096174 A1\* 4/2018 Finger ................... G06F 21/629

FOREIGN PATENT DOCUMENTS

JP       5623234 B2    11/2014
JP    2017068722 A  \*   4/2017    ........... G06F 3/1204
JP    2017107396 A  \*   6/2017    ......... G06F 21/6245

\* cited by examiner

*Primary Examiner* — Benjamin E Lanier
(74) *Attorney, Agent, or Firm* — Canon U.S.A., Inc. IP Division

(57) ABSTRACT

An authority transfer system comprising a client, a resource server, a server that receives, from the client, an authorization request requesting permission to access to a resource managed by the resource server, and a user terminal possessed by an owner of the resource is provided. The server registers a first user terminal in accordance with a registration request of the first user terminal being received from the first user terminal, and determines whether or not a registered second user terminal can be deregistered in accordance with a registration cancellation request being received from the first user terminal, and if it is determined that the second user terminal can be deregistered, authenticates the first user terminal or the second user terminal, and deregisters the second user terminal in accordance with the authentication.

14 Claims, 19 Drawing Sheets

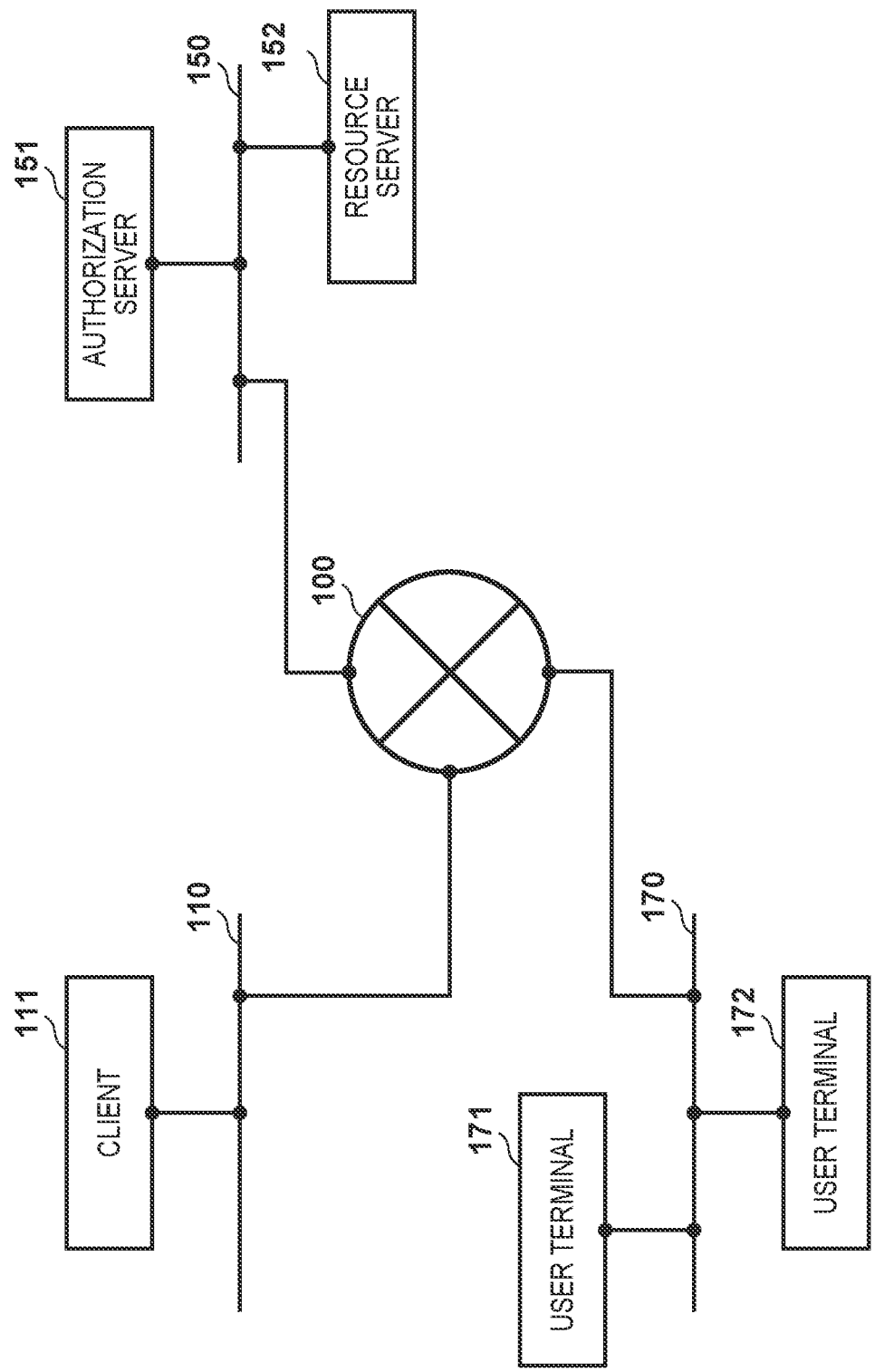

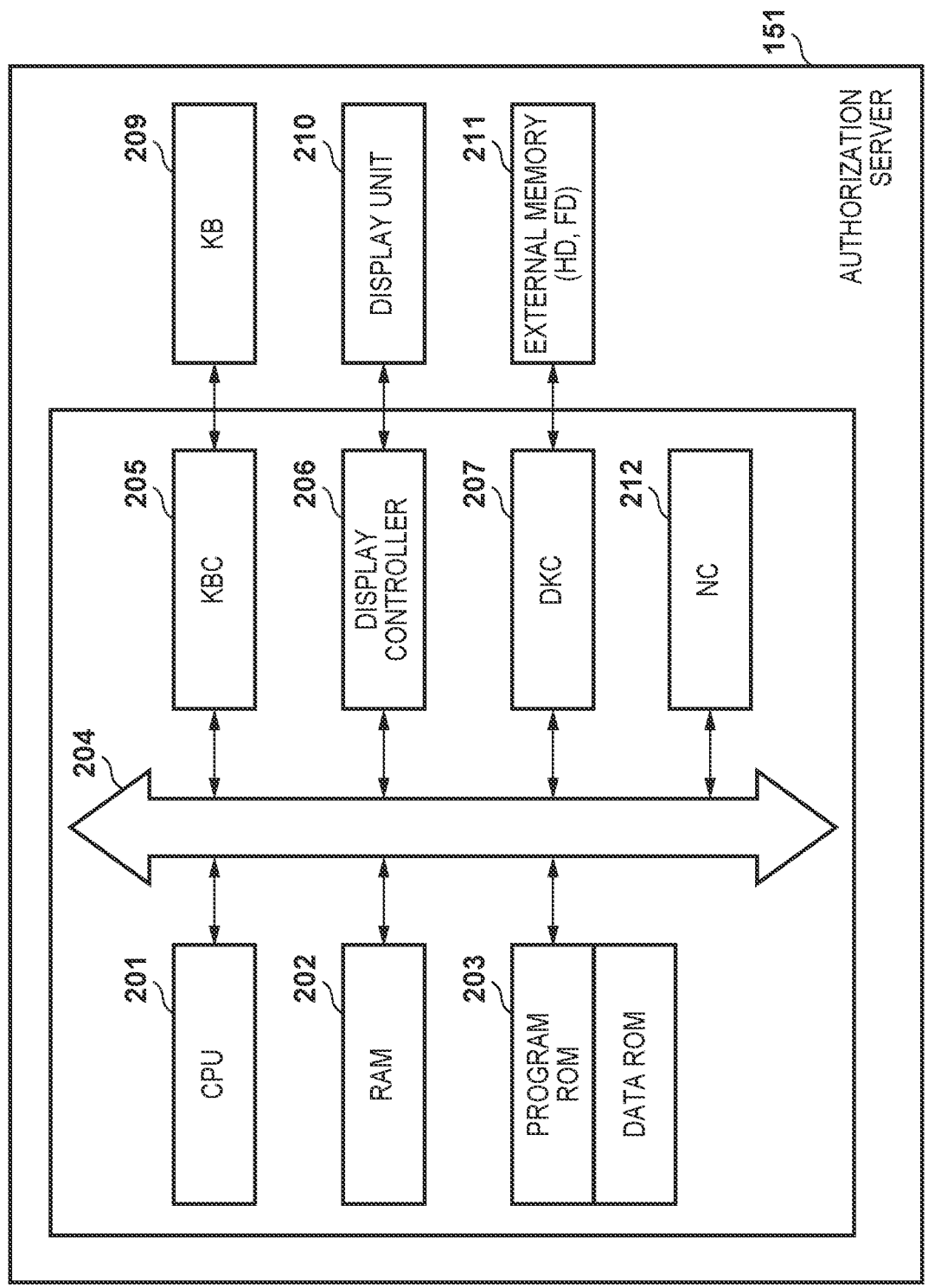

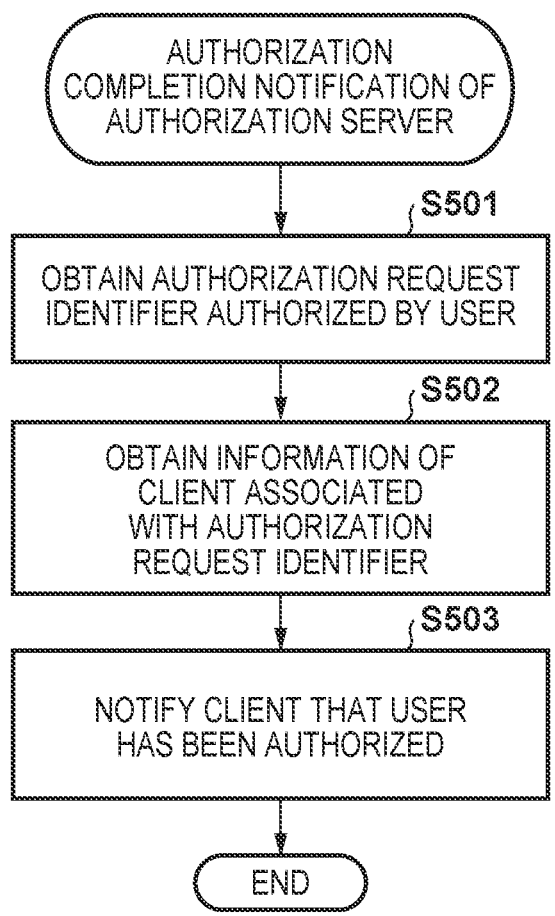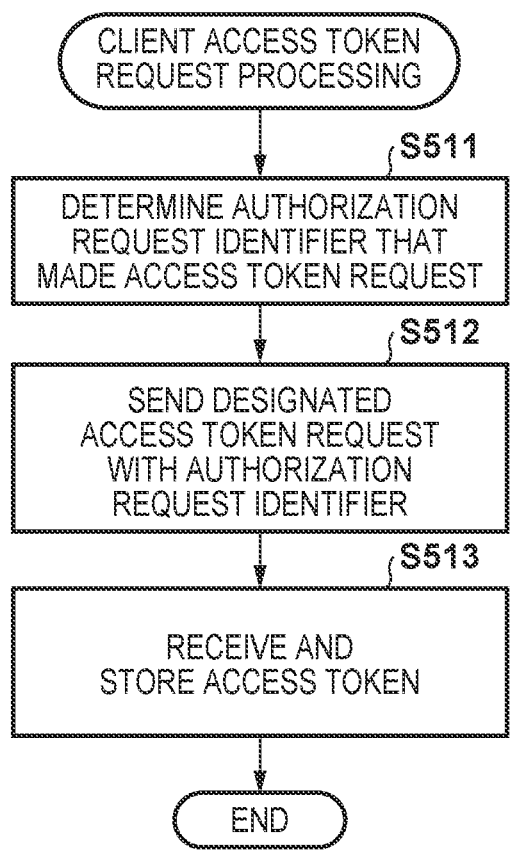

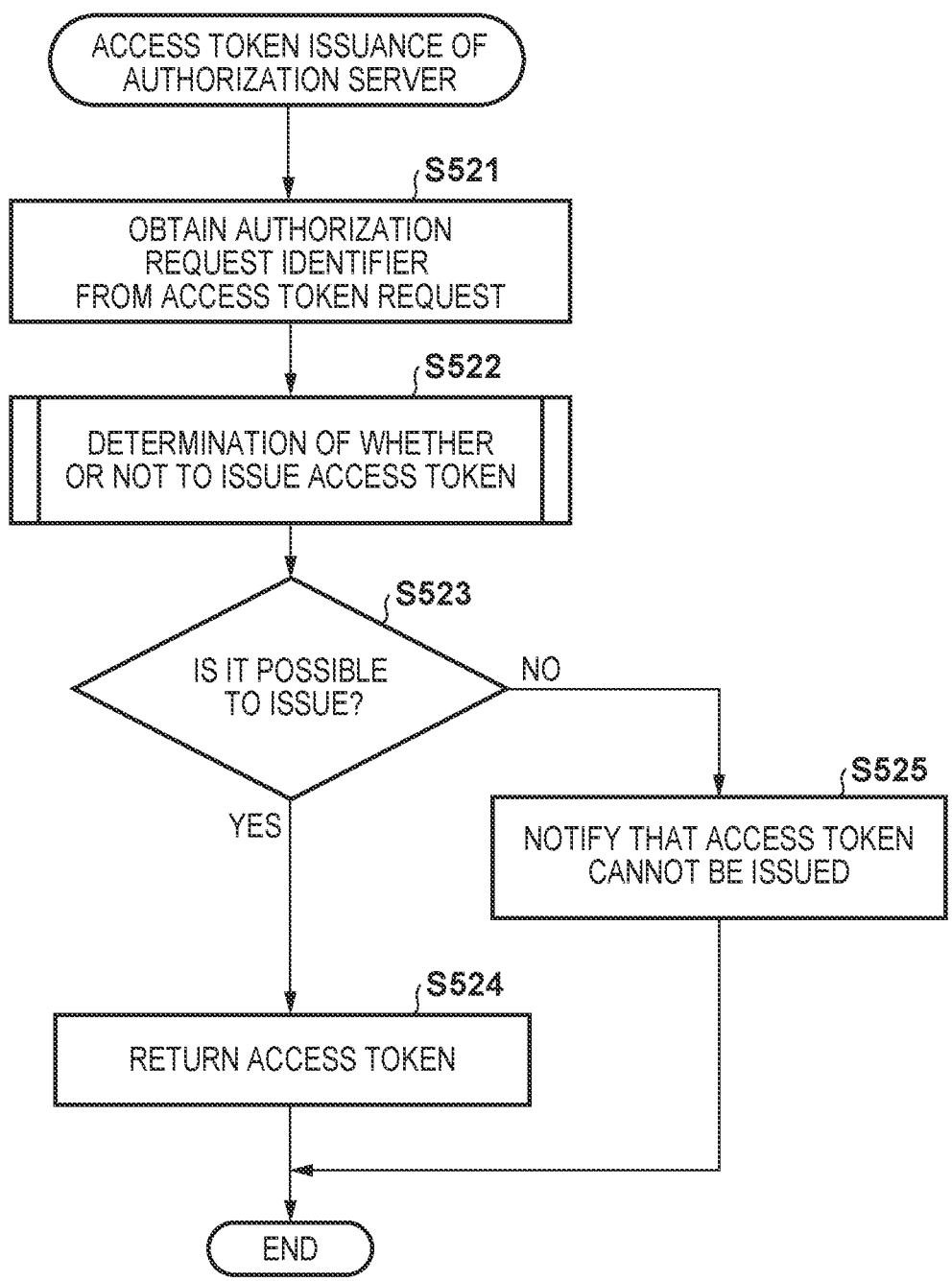

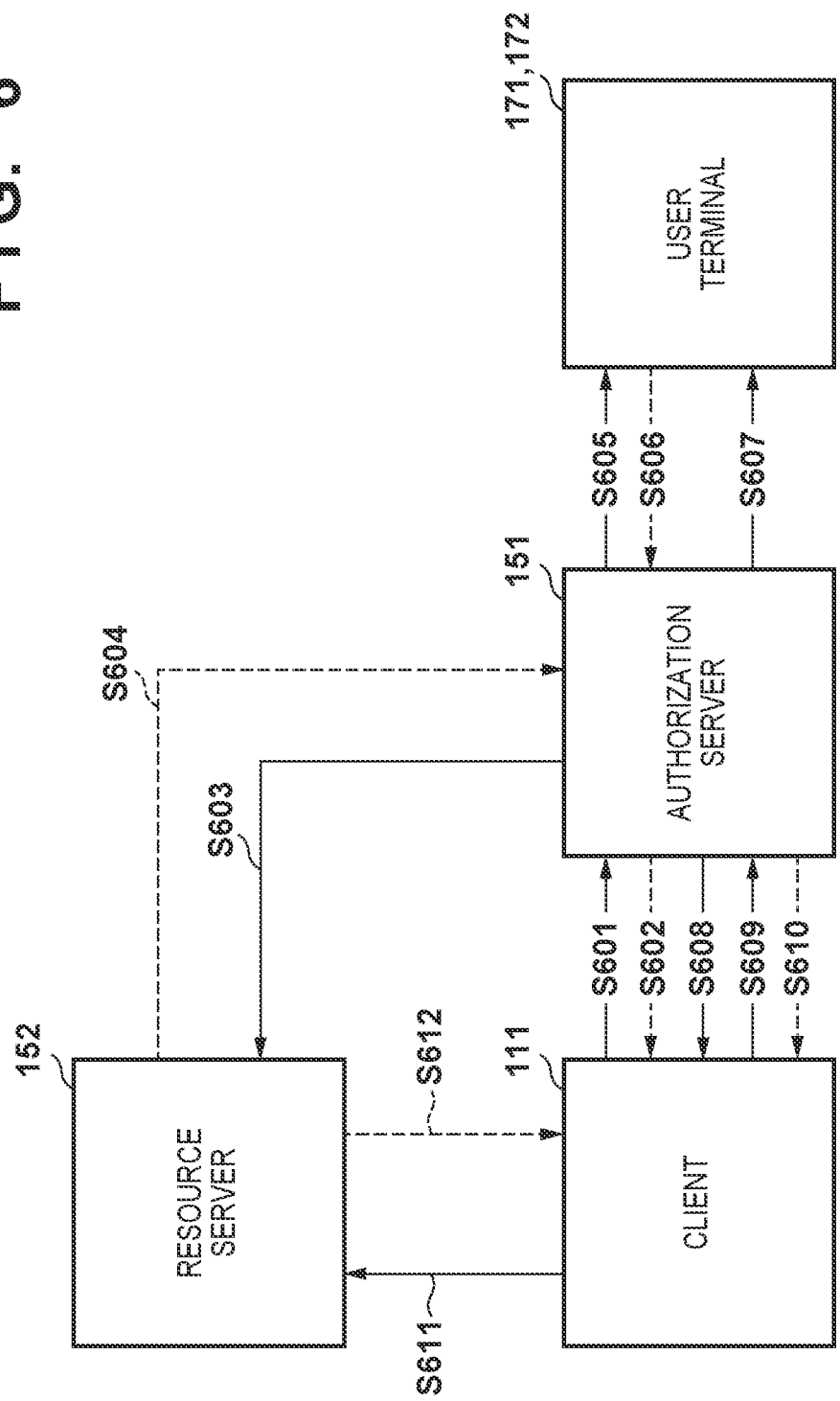

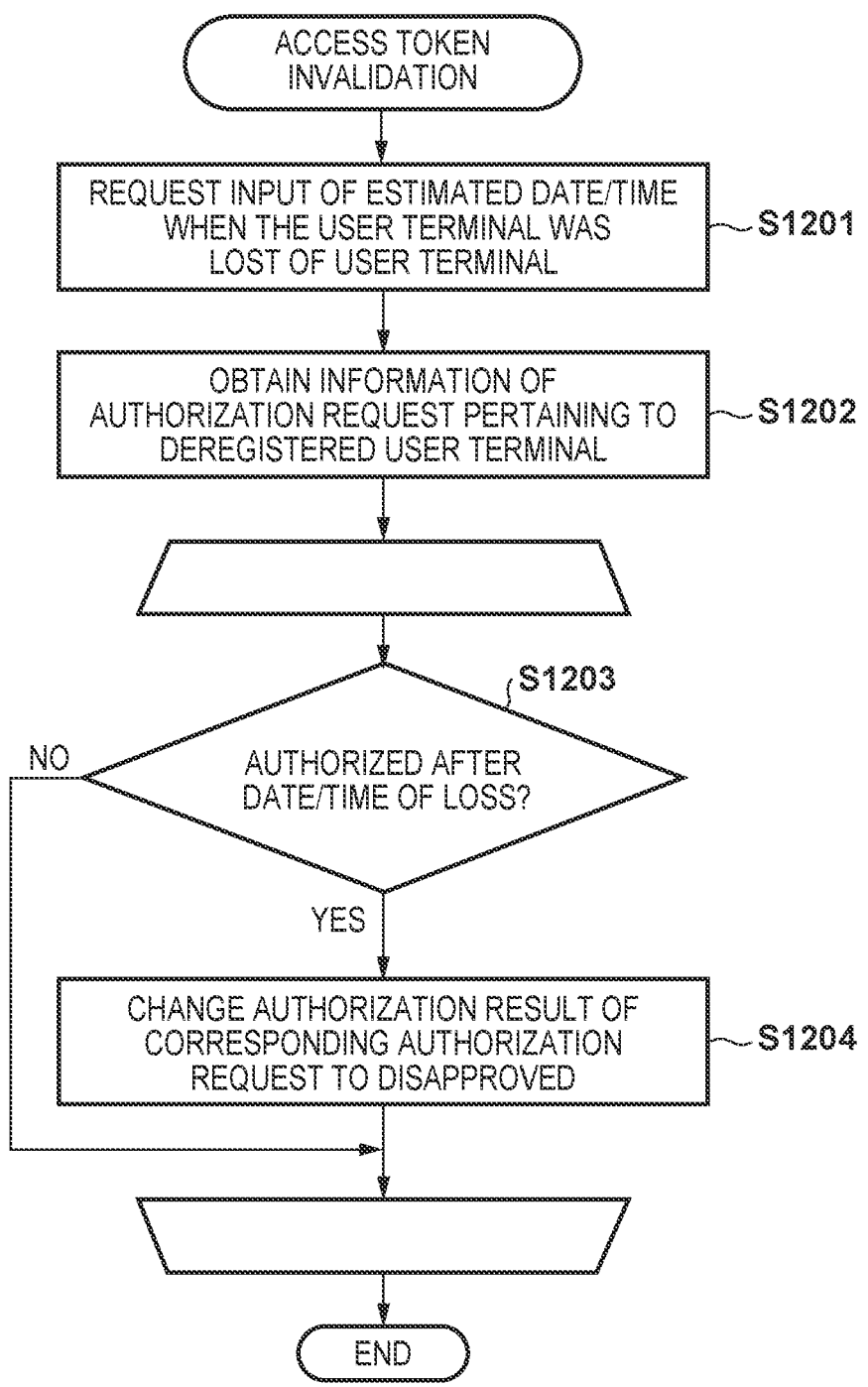
F I G. 12

FIG. 13A

USER MANAGEMENT TABLE

| USER IDENTIFIER | CREDENTIAL | USER TERMINAL IDENTIFIER | USER TERMINAL INFORMATION |
|---|---|---|---|
| user_abcde | ***** | dev_abcde_1<br>dev_abcde_2 | 192.168.0.1<br>192.168.0.2 |
| user_klmno | ***** | dev_klmno_1<br>dev_klmno_2 | 192.168.0.3<br>192.168.0.4 |
| ... | ... | ... | ... |

FIG. 13B

AUTHORIZATION REQUEST MANAGEMENT TABLE

| AUTHORIZATION REQUEST IDENTIFIER | RESOURCE IDENTIFIER | SCOPE | ACCESS TOKEN IDENTIFIER |
|---|---|---|---|
| auth_req_id_12345 | /datalake/iot0010/data | get-data | (EMPTY) |
| auth_req_id_98765 | /datalake/iot0011/data | get-data | actk111222333 |
| ... | ... | ... | ... |

F I G. 13C

AUTHORIZATION CONFIRMATION STATUS MANAGEMENT TABLE

| AUTHORIZATION REQUEST IDENTIFIER | CLIENT IDENTIFIER | RESOURCE | SCOPE | USER IDENTIFIER | AUTHORIZATION RESULT |
|---|---|---|---|---|---|
| auth_req_id_12345 | client_xyz | /datalake/iot0010/data | get-data | user_abcde | (EMPTY) |
| auth_req_id_98765 | client_xyz | /datalake/iot0011/data | get-data | user_abcde | approved |
| auth_req_id_44444 | client_xyz | /datalake/iot0011/data | get-data | user_abcde | disapproved |
| ... | | | | | |

F I G. 13D

AUTHORIZATION REQUEST INFORMATION TABLE

| AUTHORIZATION REQUEST IDENTIFIER | DATE/TIME OF THE AUTHORIZATION OPERATION | AUTHORIZED USER TERMINAL |
|---|---|---|
| auth_req_id_98765 | MAY 23, 2019, 5:04PM | dev_abcde_1 |
| auth_req_id_44444 | SEPTEMBER 24, 2019, 8:01AM | dev_abcde_2 |
| ... | | |

FIG. 14A

RESOURCE MANAGEMENT TABLE

| RESOURCE IDENTIFIER | USER IDENTIFIER |
|---|---|
| /datalake/iot0010/data | user_abcde |
| /datalake/iot0011/data | user_abcde |
| ... | ... |

FIG. 14B

CLIENT MANAGEMENT TABLE

| CLIENT IDENTIFIER | CLIENT END POINT |
|---|---|
| client_xyz | 10.0.0.1 |
| client_aaa | 10.0.1.1 |
| client_bbb | 10.0.2.1 |
| ... | ... |

FIG. 14C

ACCESS TOKEN MANAGEMENT TABLE

| ACCESS TOKEN IDENTIFIER | USER IDENTIFIER | SCOPE |
|---|---|---|
| actk111222333 | user_abcde | get-data |
| ... | ... | ... |

AUTHORITY TRANSFER SYSTEM, SERVER AND METHOD OF CONTROLLING THE SERVER, AND STORAGE MEDIUM

BACKGROUND

Field of the Disclosure

The present disclosure relates to an authority transfer system, a server and a method of controlling the server, and a storage medium.

Description of the Related Art

OAuth 2.0 is used to transfer authority in cloud-based web services. Japanese Patent No. 5623234 describes a technique in which user authority can be transferred to a client by the user performing an authorization operation for both the client and an authorization server via a web browser when the user configures system cooperation. Through this, system cooperation is realized by the client accessing user resources using the user's authority which has been transferred.

To transfer a user's authority to a client in OAuth 2.0, the user must access the client using a web browser. For example, consider a case of a multi-tenant system that requires the permission of each tenant's administrator when analyzing each tenant's data from an external system. In this case, the tenant's administrator cannot be expected to access the external system, which is the client, at the timing of the analysis processing, and the client must therefore independently request the authority to be transferred.

By having the client independently request the authority to be transferred, the client can designate a user and request the transfer of authority even when the user is not accessing the client. At this time, a terminal owned by the user is registered in advance in the authorization server which receives the request for the transfer of authority. When the client then requests the transfer of authority, the authorization server requests permission to transfer the authority to the registered user terminal, and the user can then decide whether or not to transfer the authority through their own terminal. However, there are cases where the user wishes to deregister their user terminal, such as when the user has lost a registered user terminal or has replaced their terminal but no longer has the old terminal in their possession after registering the new terminal, and there have been no methods for handling such a situation.

SUMMARY

An aspect of the present disclosure is to eliminate the above-mentioned issue with conventional technology.

A feature of the present disclosure is to provide a technique which makes it possible for a user to deregister a user terminal even in a situation where the user cannot operate the user terminal to be deregistered.

According to a first aspect of the present disclosure, there is provided an authority transfer system comprising a client, a resource server, a server that receives, from the client, an authorization request requesting permission to access to a resource managed by the resource server, and a user terminal possessed by an owner of the resource, wherein the server includes at least one processor and at least one memory configured to function as: a receiving unit that receives an authorization start request from the client; a specifying unit that, in accordance with the authorization start request being received by the receiving unit, specifies a registered user terminal that is to serve as a destination of an authorization confirmation request; an authorizing unit that sends the authorization confirmation request to the specified user terminal and receives a result of an authorization confirmation as a response; an issuing unit that controls issuing of an access token in accordance with the result of the authorization confirmation, and in a case that the access token has been issued, sends the access token to the client that sent the authorization start request; a registering unit that registers a first user terminal in accordance with a registration request of the first user terminal being received from the first user terminal; a determining unit that determines whether or not a second user terminal registered by the registering unit can be deregistered in accordance with a registration cancellation request of the second user terminal being received from the first user terminal; and a deregistering unit that, in a case that the determining unit has determined that the second user terminal can be deregistered, confirms the deregistration with the first user terminal that sent the registration cancellation request, and deregisters the second user terminal in a case that the deregistration is confirmed.

According to a second aspect of the present disclosure, there is provided an authority transfer system comprising a client, a resource server, a server that receives, from the client, an authorization request requesting permission to access to a resource managed by the resource server, and a user terminal possessed by an owner of the resource, wherein the server includes at least one processor and at least one memory configured to function as: a first receiving unit that receives an authorization start request from the client; a specifying unit that, in accordance with the authorization start request being received by the first receiving unit, specifies a registered user terminal that is to serve as a destination of an authorization confirmation request; an authorizing unit that sends the authorization confirmation request to the specified user terminal and receives a result of an authorization confirmation as a response; an issuing unit that controls issuing of an access token in accordance with the result of the authorization confirmation, and in a case that the access token has been issued, sends the access token to the client that sent the authorization start request; a registering unit that registers a first user terminal in accordance with a registration request of the first user terminal being received from the first user terminal; a determining unit that determines whether or not a second user terminal registered by the registering unit can be deregistered in accordance with a registration cancellation request of the second user terminal being received from the first user terminal; an authenticating unit that, in a case that the determining unit has determined that the second user terminal can be deregistered, authenticates the first user terminal or the second user terminal; and a deregistering unit that deregisters the second user terminal in accordance with the authentication by the authenticating unit.

According to a third aspect of the present disclosure, there is provided a server that receives, from a client, an authorization request requesting permission to access a resource managed by a resource server, and sends an authorization confirmation request to a user terminal, the server comprising at least one processor and at least one memory configured to function as: a receiving unit that receives an authorization start request from the client; a specifying unit that, in accordance with the authorization start request being received by the receiving unit, specifies a registered user terminal that is to serve as a destination of an authorization confirmation request; an authorizing unit that sends the authorization confirmation request to the specified user terminal and receives a result of an authorization confirmation as a response; an issuing unit that controls issuing of an access token in accordance with the result of the authorization confirmation, and in a case that the access token has been issued, sends the access token to the client that sent the authorization start request; a registering unit that registers a first user terminal in accordance with a registration request of the first user terminal being received from the first user terminal; a determining unit that determines whether or not a second user terminal registered by the registering unit can be deregistered in accordance with a registration cancellation request for the second user terminal being received from the first user terminal; and a deregistering unit that, in a case that the determining unit has determined that the second user terminal can be deregistered, confirms the deregistration with the first user terminal that sent the registration cancellation request, and deregisters the second user terminal when the deregistration is confirmed.

According to a fourth aspect of the present disclosure, there is provided a server that receives, from a client, an authorization request requesting permission to access a resource managed by a resource server, and sends an authorization confirmation request to a user terminal, the server comprising at least one processor and at least one memory configured to function as: a first receiving unit that receives an authorization start request from the client; a specifying unit that, in accordance with the authorization start request being received by the first receiving unit, specifies a registered user terminal that is to serve as a destination of an authorization confirmation request; an authorizing unit that sends the authorization confirmation request to the specified user terminal and receives a result of an authorization confirmation as a response; an issuing unit that controls issuing of an access token in accordance with the result of the authorization confirmation, and in a case that the access token has been issued, sends the access token to the client that sent the authorization start request; a registering unit that registers a first user terminal in accordance with a registration request of the first user terminal being received from the first user terminal; a determining unit that determines whether or not a second user terminal registered by the registering unit can be deregistered in accordance with a registration cancellation request for the second user terminal being received from the first user terminal; an authenticating unit that, in a case that the determining unit has determined that the second user terminal can be deregistered, authenticates the first user terminal or the second user terminal; and a deregistering unit that deregisters the second user terminal in accordance with the authentication by the authenticating unit.

Further features of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the disclosure and, together with the description, serve to explain the principles of the disclosure.

FIG. 1 is a diagram for describing the configuration of an authority transfer system according to a first embodiment of the present disclosure.

FIG. 2 is a diagram for describing the hardware configuration of an authorization server according to the first embodiment.

FIG. 5A is a flowchart for describing processing performed when the authorization server makes an authorization completion notification to the client, according to the first embodiment.

FIG. 5B is a flowchart for describing processing performed when the client makes an access token request to the authorization server, according to the first embodiment.

FIG. 5C is a flowchart for describing processing performed when the authorization server issues an access token, according to the first embodiment.

FIG. 6 is a diagram for describing an overall flow from when the client makes the authorization start request to the authorization server to when the client obtains an access token and accesses the resource, according to the first embodiment.

FIG. 12 is a flowchart for describing processing performed when the authorization server invalidates a specific authorization result after deregistering a user terminal, according to a fourth embodiment.

FIG. 13A is a diagram illustrating an example of a user management table according to the first embodiment.

FIG. 13B is a diagram illustrating an example of an authorization request management table according to the first embodiment.

FIG. 13C is a diagram illustrating an example of an authorization confirmation status management table according to the first embodiment.

FIG. 13D is a diagram illustrating an example of an authorization request information table according to the first embodiment.

FIG. 14A is a diagram illustrating an example of a resource management table according to the first embodiment.

FIG. 14B is a diagram illustrating an example of a client management table according to the first embodiment.

FIG. 14C is a diagram illustrating an example of an access token management table according to the first embodiment.

DESCRIPTION OF THE EMBODIMENTS

Figure 3A:
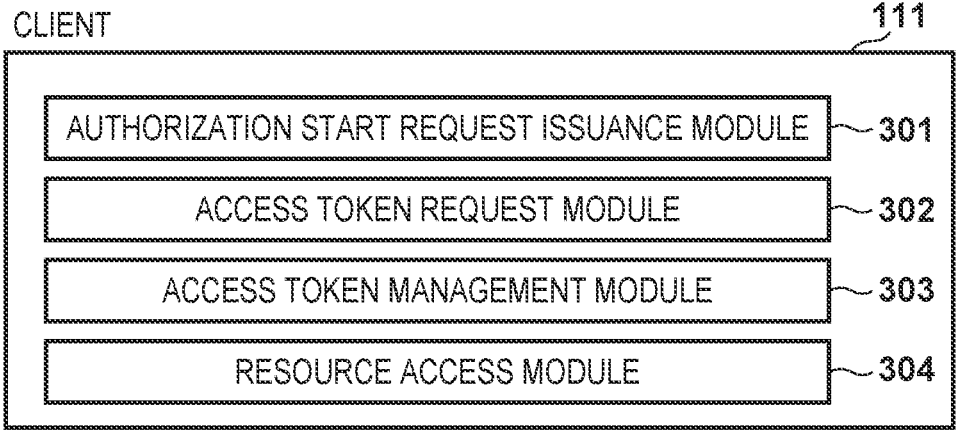
FIG. 3A is a function block diagram for describing the functional configuration of a client according to the first embodiment.

Embodiments of the present disclosure will be described hereinafter in detail, with reference to the accompanying drawings. It is to be understood that the following embodiments are not intended to limit the claims, and that not all of the combinations of the aspects that are described according to the following embodiments are necessarily required.

First Embodiment

FIG. 1 is a diagram for describing the configuration of an authority transfer system according to a first embodiment of the present disclosure.

A network 100 is a Wide Area Network (WAN), and is constructed as a World Wide Web (WWW) system here. LANs 110, 150, and 170 are Local Area Networks connecting the respective constituent elements to each other.

A resource server 152 is a server which manages user resources. A client 111 is a client which accesses a resource on the resource server 152. Here, it is necessary for an owner of the resource to transfer authority in order for the client 111 to access the resource on the resource server 152. An authorization server 151 issues an access token which serves as evidence that the client is permitted to access the resource in response to a request from the client. User terminals 171 and 172 display an authorization confirmation screen when the client 111 has requested authority to be transferred. Although there are only two user terminals in FIG. 1, there may be more user terminals.

The authorization server 151 and the resource server 152 connect to the WAN 100 over the LAN 150. Likewise, the client 111 connects to the WAN 100 over the LAN 110, and the user terminals 171 and 172, over the LAN 170. Note that the authorization server 151 and the resource server 152 may be provided on separate individual LANs, or may be provided on the same LAN. These servers may also be configured on the same PC or server computer. Furthermore, although there are one each of the authorization server 151 and the resource server 152 in FIG. 1, these may instead be a server system including a plurality of servers. The authorization server 151 may also be configured as a cluster of a plurality of servers. Note that in the embodiments, references to a "server system" are assumed to indicate a device which is constituted by at least one server and which provides a specific service.

FIG. 2 is a diagram for describing the hardware configuration of the authorization server 151 according to the first embodiment. The client 111, the resource server 152, the user terminals 171 and 172, and so on have similar hardware configurations. Note that the block diagram illustrating the hardware configuration illustrated in FIG. 2 corresponds to the hardware configuration of a typical information processing apparatus, and the hardware configuration of such a typical information processing apparatus can be applied in the servers and terminals according to the embodiments.

In FIG. 2, a CPU 201 executes programs, such as an OS or applications, that are stored in program ROM within ROM 203 or deployed in RAM 202 from external memory 211 such as a hard disk. Here, "OS" is an acronym for "operating system", which runs on a computer, and the operating system will be referred to as an "OS" hereinafter. The processing in each of the flowcharts described later is realized by the CPU 201 controlling the various units connected to a bus 204 by executing those programs. The RAM 202 provides main memory, a work area, and so on for the CPU 201. A keyboard controller (KBC) 205 controls key inputs from a keyboard (KB) 209, a pointing device (not shown), or the like. A display controller 206 controls displays made in a display unit 210. A disk controller (DKC) 207 controls access to the external memory 211, which is a hard disk (HD) or the like and stores various types of data. A network controller (NC) 212 is connected to a network and executes processing for controlling communication with other devices connected to the network. Note that the display unit 210 may have touch panel functionality and handle some of the functions of the keyboard (KB) 209 instead.

Note that in the following descriptions, unless specified otherwise, the CPU 201 is the main hardware entity that executes processing, the programs such as the OS and applications stored in the external memory 211, the ROM 203, and the like are the main software entities, and the various functions described in the embodiments are realized by the CPU 201 executing those programs.

FIGS. 3A to 3D are function block diagrams for describing the functional configurations of the client 111, the authorization server 151, the resource server 152, and the user terminals 171 and 172, respectively, according to the first embodiment.

FIG. 3A is a function block diagram for describing the functional configurations of the client 111. The client 111 includes an authorization start request issuance module 301, an access token request module 302, an access token management module 303, and a resource access module 304.

Figure 3B:
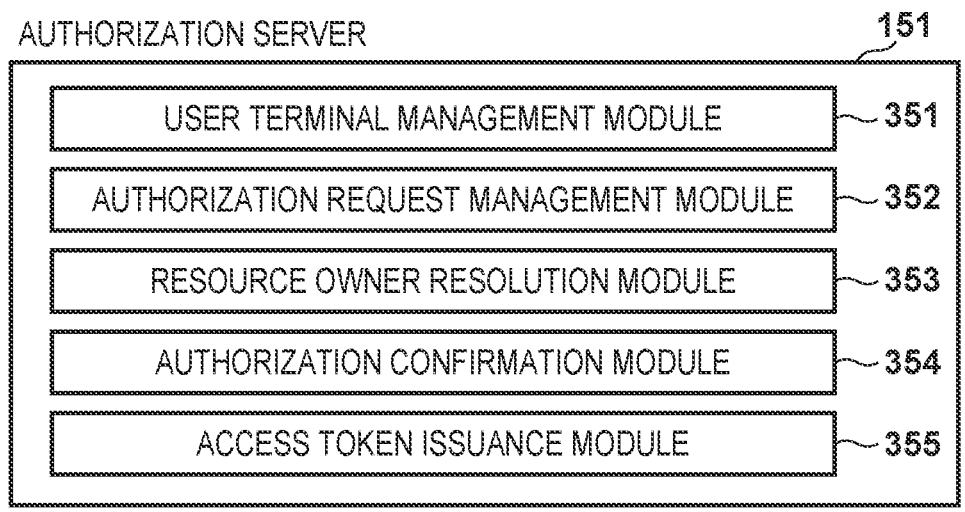
FIG. 3B is a function block diagram for describing the functional configuration of the authorization server according to the first embodiment.

FIG. 3B is a function block diagram for describing the functional configurations of the authorization server 151. The authorization server 151 includes a user terminal management module 351, an authorization request management module 352, a resource owner resolution module 353, an authorization confirmation module 354, and an access token issuance module 355.

Figure 3C:
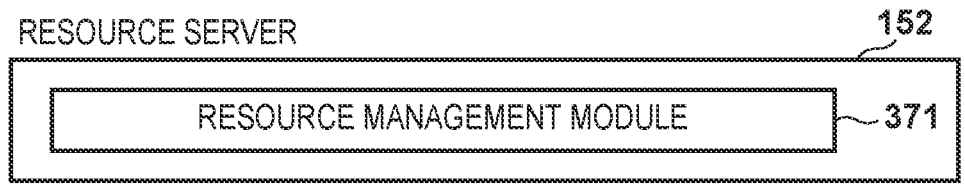
FIG. 3C is a function block diagram for describing the functional configuration of a resource server according to the first embodiment.
Figure 3D:
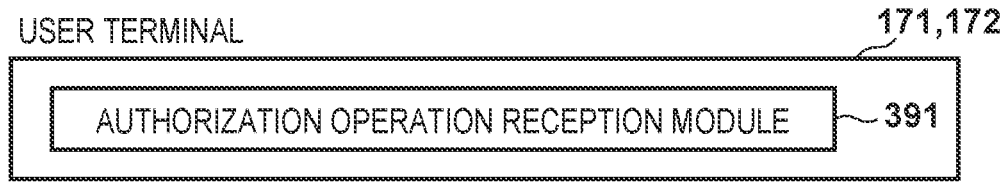
FIG. 3D is a function block diagram for describing the functional configuration of a user terminal according to the first embodiment.

FIG. 3C is a function block diagram for describing the functional configurations of the resource server 152. The resource server 152 includes a resource management module 371. FIG. 3D is a function block diagram for describing the functional configurations of the user terminals 171 and 172. Each of the user terminals 171 and 172 includes an authorization operation reception module 391. Because the user terminals 171 and 172 have the same configuration, the user terminal 171 will be described as a representative example unless specified otherwise.

The user terminal management module 351 of the authorization server 151 manages user information and user terminals registered in the authorization server 151, and performs processing for registering and deregistering a user terminal in response to a request from the user terminal 171.

FIG. 13A is a diagram illustrating an example of a user management table which stores a relationship between users and the user terminal 171. Note that this user management table is stored in, for example, the external memory 211 of the authorization server 151. Each user is managed using a user identifier for uniquely identifying that user. Although FIG. 13A illustrates an example in which a single user possesses two user terminals, the user may possess three or more terminals.

Here, it can be seen that identifiers of the user terminals corresponding to the user identifier "user_abcde" are "dev_abcde_1" and "dev_abcde_2", and that user terminal information thereof are "192.168.0.1" and "192.168.0.2". Additionally, credential information is confidential information (e.g., a password) saved when the user registers their own information in the authorization server 151, and can be used to authenticate the user by associating the information with the user identifier.

Figure 8:
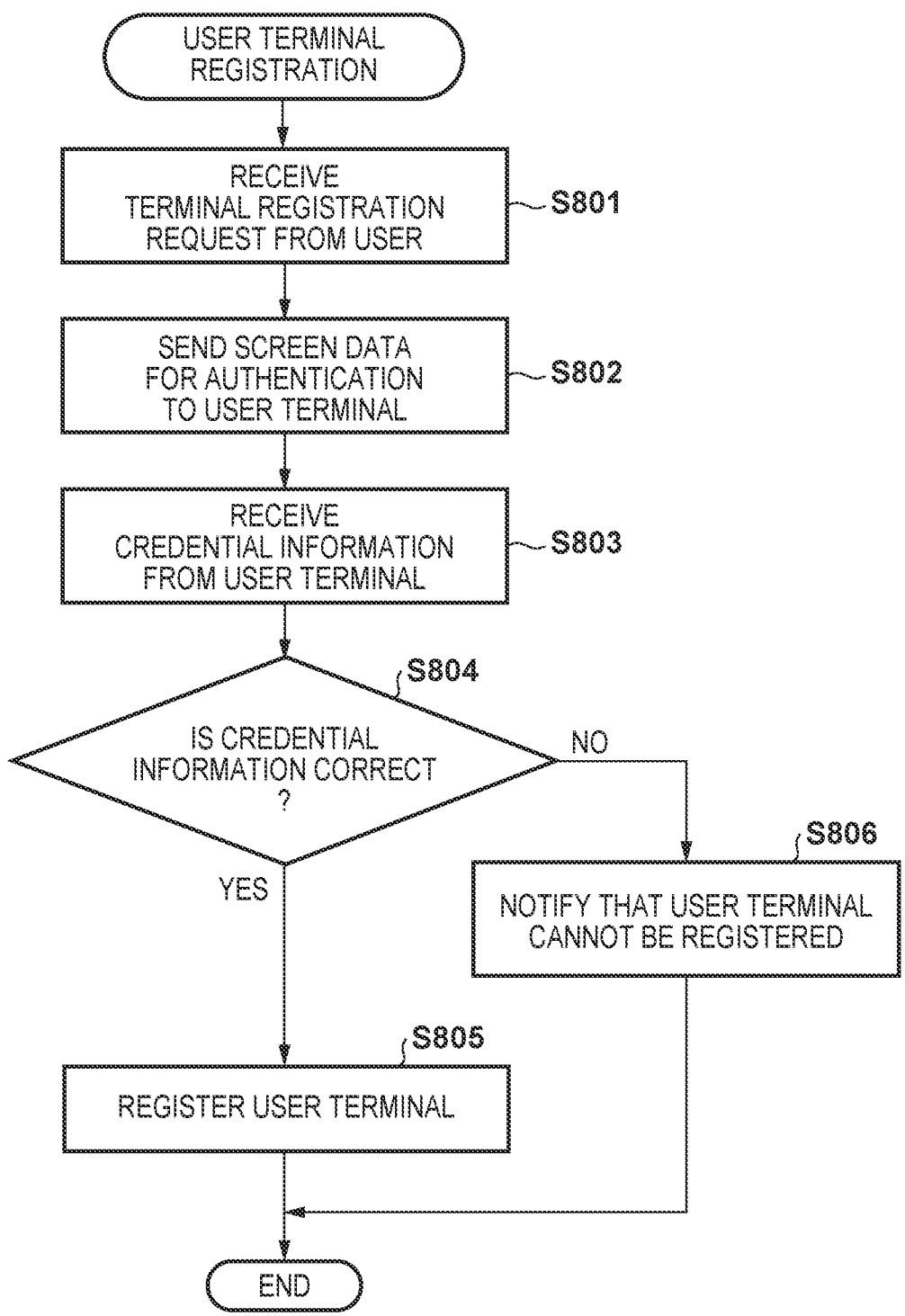
FIG. 8 is a flowchart for describing processing performed by the authorization server when the user terminal makes a user terminal registration request to the authorization server, according to the first embodiment.

FIG. 8 is a flowchart for describing processing performed by the authorization server 151 when the user terminal 171 makes a user terminal registration request to the authorization server 151, according to the first embodiment. The processing described in this flowchart is started upon the user terminal management module 351 of the authorization server 151 receiving a user terminal registration request from the user terminal 171. Note that the processing described in this flowchart is realized by the aforementioned CPU 201 of the authorization server 151 deploying a program in the RAM 202 and executing the program so as to function as the user terminal management module 351.

First, in step S801, the CPU 201 receives the user terminal registration request from the user terminal 171. The user terminal registration request includes the user identifier, a device identifier, and so on. Next, in step S802, the CPU 201 creates screen data (an HTML page) for entering the credential information into the user terminal 171, and sends that screen data to the user terminal 171. Then, in step S803, the CPU 201 receives, from the user terminal 171, the credential information entered through a screen displayed on the basis of the screen data sent in step S802. The processing then advances to step S804, where the CPU 201 determines whether or not the credential information received in step S803 is correct. In other words, the CPU 201 determines whether or not the credential information matches credential information, in the aforementioned user management table, which corresponds to the user identifier included in the registration request. If the credential information is determined to be correct, the processing advances to step S805, and if not, the processing advances to step S806. In step S805, the CPU 201 saves that user terminal 171 in the user management table in the external memory 211 in association with the user identifier and notifies the user terminal 171 that the user terminal registration has ended successfully, after which this processing ends. On the other hand, in step S806, the CPU 201 notifies the user terminal 171 that the user terminal registration has failed, after which this processing ends.

The authorization request management module 352 of the authorization server 151 processes an authorization start request in response to a request from the authorization start request issuance module 301 of the client 111. Here, the authorization start request includes resource information indicating the resource which the client 111 is attempting to access. Using the resource information included in the authorization start request, the resource owner resolution module 353 makes an inquiry to the resource server 152 for resource owner information pertaining to that resource. The authorization confirmation module 354 makes an authorization confirmation request to a specific user terminal 171 on the basis of the resource owner information obtained here. When the user performs an authorization operation in the user terminal 171 in response to this authorization confirmation request, the client 111 can obtain an access token from the authorization server 151 and can then access the user resources provided by the resource server 152. In other words, the authorization server 151 includes a module for executing authorization processing for the client 111 to access a resource associated with a user terminal of a user.

Figure 4A:
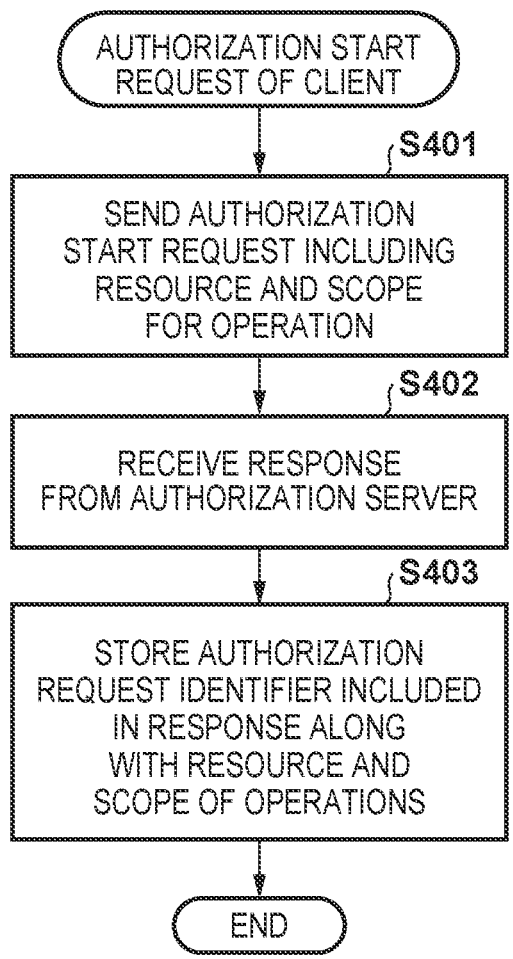
FIG. 4A is a flowchart for describing processing performed when the client makes an authorization start request to the authorization server, according to the first embodiment.

FIG. 4A is a flowchart for describing processing performed when the client 111 makes an authorization start request to the authorization server 151, according to the first embodiment. The processing described in the flowchart is started when an access token has become necessary in preparation for the client 111 to access a resource on the resource server 152. Note that the processing described in this flowchart is realized by a CPU of the client 111 deploying a program in RAM and executing the program so as to function as the authorization start request issuance module 301.

First, in step S401, the authorization start request issuance module 301 sends the authorization start request, including a resource identifier and a scope for operation, to the authorization server 151. The scope indicates the range of access for the resource, and when, for example, a resource is to be obtained, is specified as "get-data". The processing then advances to step S402, where the authorization start request issuance module 301 receives a response from the authorization server 151. The response includes an authorization request identifier issued by the authorization server 151. The processing then advances to step S403, where the authorization start request issuance module 301 stores the authorization request identifier included in the response received in step S402, along with the resource and scope of operations from step S401, and ends the processing.

FIG. 13B is a diagram illustrating an example of an authorization request management table stored by the client 111, according to the first embodiment.

In FIG. 13B, an authorization start request made with the scope "get-data" is stored in association with an authorization request identifier of "auth_req_id_12345" for a resource indicated by a resource identifier "/datalake/iot0010/data". FIG. 13B also indicates that an access token having an identifier of "actk111222333" has already been obtained for an authorization request identifier of "auth_req_id_98765". Here, the resource indicated by the resource identifier may be a single file in a filesystem, or may be a specific record in a database. The resource may also be a collection thereof.

Figure 4B:
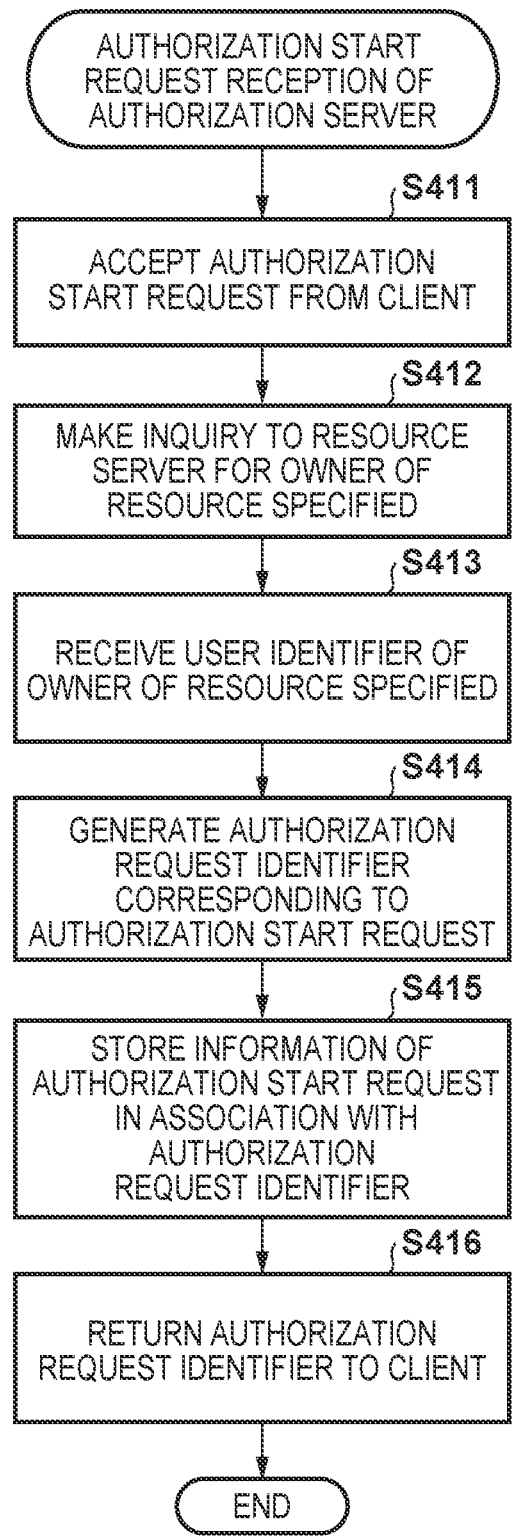
FIG. 4B is a flowchart for describing processing performed when the authorization server has received an authorization start request from the client, according to the first embodiment.

FIG. 4B is a flowchart for describing processing performed when the authorization server 151 has received an authorization start request from the client 111, according to the first embodiment. This processing is started in response to the authorization server 151 receiving the authorization start request from the client 111. Note that the processing described in this flowchart is realized by the CPU 201 of the authorization server 151 deploying a program in the RAM 202 and executing the program.

First, in step S411, functioning as the authorization request management module 352, the CPU 201 accepts the authorization start request from the client 111. Here, the authorization start request includes a client identifier of the client 111 and the resource identifier indicating the resource which the client 111 is to operate. Next, in step S412, functioning as the resource owner resolution module 353, the CPU 201 makes an inquiry to the resource server 152 for the owner of the resource specified in the authorization start request. The processing then advances to step S413, where functioning as the resource owner resolution module 353, the CPU 201 receives, from the resource server 152, the user identifier of the owner of the resource specified in the authorization start request, as a response to the inquiry made in step S412. The processing then advances to step S414, where functioning as the authorization request management module 352, the CPU 201 generates an authorization request identifier corresponding to the authorization start request received in step S411. The processing then advances to step S415, where functioning as the authorization request management module 352, the CPU 201 stores information of the authorization request in association with the authorization request identifier generated in step S414. Here, the "information of the authorization request" includes the client identifier included in the authorization start request, the resource identifier and scope for operation, and the user identifier of the owner of the resource received in step S413.

FIG. 13C is a diagram illustrating an example of an authorization confirmation status management table stored by the authorization request management module 352 in step S415.

In FIG. 13C, a client indicated by a client identifier of "client_xyz" stores the authorization start request made with the scope "get-data" in association with the authorization request identifier of "auth_req_id_12345" for the resource indicated by the resource identifier "/datalake/iot0010/data". Additionally, the authorization request identifier of "auth_req_id_12345" and the user identifier of "user_abcde" are associated as well, which indicates that resolving the resource owner of the resource "/datalake/iot0010/data" shows that the identifier of the owner of that resource is "user_abcde". Note that the authorization result of the authorization request identifier "auth_req_id_12345" being empty indicates that the user has not yet performed the authorization operation. On the other hand, the authorization result of the authorization request identifier "auth_req_id_98765" is "approved", and that the authorization result of an authorization request identifier "auth_req_id_44444" is "disapproved". These indicate that the owner of the resource has accepted the authorization, and that the owner of the resource has rejected the authorization, respectively.

FIG. 13D is a diagram illustrating an example of an authorization request information table, stored by the authorization server 151, which contains information on the respective authorization requests in the authorization confirmation status management table illustrated in FIG. 13C. The information is information on the date/time the authorization operation was performed, and the user terminal which performed the authorization operation. Note that the tables illustrated in FIGS. 13C and 13D may be managed as the same table. Here, it can be seen that the authorization operation for the authorization request identifier "auth_req_id_98765" was performed on "May 23, 2019, 5:04 PM" through the user terminal "dev_abcde_1". Furthermore, the authorization operation for the authorization request identifier "auth_req_id_44444" was performed on "Sep. 24, 2019, 8:01 AM" through the user terminal "dev_abcde_2". The respective pieces of information are associated in this manner.

The processing then advances to step S416, where functioning as the authorization request management module 352, the CPU 201 returns the authorization request identifier generated in step S414 to the client 111 as a response to the authorization start request from the client 111, after which this processing ends.

In this manner, the authorization server 151 stores the authorization request identifier and the identifier of the client 111 in association with each other in the authorization confirmation status management table on the basis of the authorization start request from the client 111.

Figure 4C:
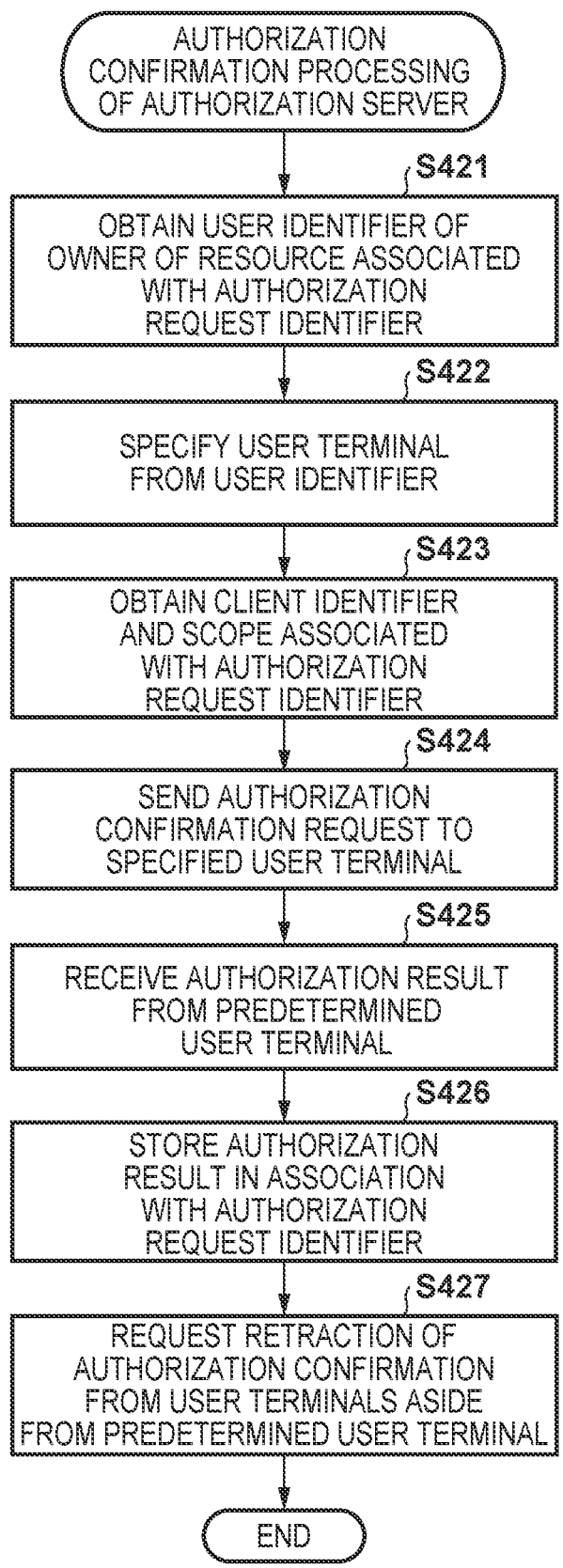
FIG. 4C is a flowchart for describing processing performed when the authorization server makes an authorization confirmation request to the user terminal, according to the first embodiment.

FIG. 4C is a flowchart for describing processing performed when the authorization server 151 makes the authorization confirmation request to a user terminal, according to the first embodiment. The processing described in this flowchart is started upon the information of the authorization request being stored in step S415. Note that the processing described in this flowchart is realized by the CPU 201 of the authorization server 151 deploying a program in the RAM 202 and executing the program.

In step S421, functioning as the authorization confirmation module 354, the CPU 201 obtains the user identifier of the owner of the resource, associated with the authorization request identifier stored in step S415. Then, in step S422, the CPU 201 specifies user terminals on the basis of the user identifier. Here, if the authorization request identifier stored in step S415 is "auth_req_id_12345", the associated user identifier is "user_abcde".

The processing then advances to step S423, where functioning as the authorization confirmation module 354, the CPU 201 obtains the client identifier and the scope associated with the authorization request identifier stored in step S415. Here, if the authorization request identifier stored in step S415 is "auth_req_id_12345", the associated client identifier and scope are "client_xyz" and "get-data", respectively. The processing then advances to step S424, where functioning as the authorization confirmation module 354, the CPU 201 sends, to the user terminals 171 and 172 specified in step S422, an authorization confirmation request including the client identifier and the scope obtained in step S423. Note that the method for sending the authorization confirmation request may be a communication method which designates the user terminals 171 and 172 as end points, or may be a push communication method such as MQTT. Other methods may be used as well.

Figure 7:
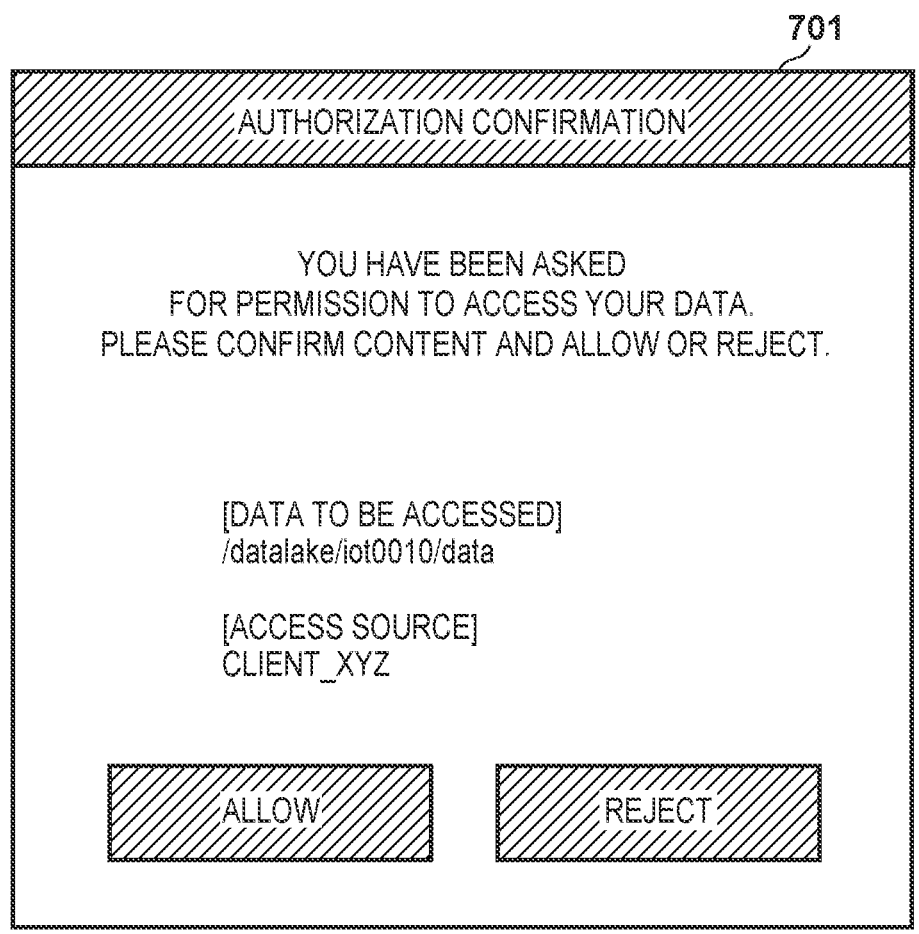
FIG. 7 is a diagram illustrating an example of an authorization confirmation screen displayed in the user terminal according to the first embodiment.

The authorization operation reception module 391 of each of the user terminals 171 and 172 which have received this authorization confirmation request display an authorization confirmation screen 701, illustrated in FIG. 7, and request authorization from the user. The main point here is that the authorization confirmation screen 701 is displayed in all of the user terminals in that user's possession.

The processing then advances to step S425, where functioning as the authorization confirmation module 354, the CPU 201 receives an authorization result from a predetermined one of the user terminals 171 and 172 as a response to the authorization confirmation request sent in step S424. The processing then advances to step S426, where functioning as the authorization confirmation module 354, the CPU 201 stores the authorization result received in step S425 in association with the authorization request identifier stored in step S415. The processing then advances to step S427.

In the example in FIG. 13C, "approved", which indicates a successful authorization, is stored for the authorization request identifier "auth_req_id_98765".

In step S427, functioning as the authorization confirmation module 354, the CPU 201 sends an authorization confirmation retraction request to the user terminals aside from the predetermined user terminal. For example, if the user has performed the authorization operation from the user terminal indicated by "192.168.0.1", the CPU 201 makes a request to retract the authorization confirmation for another user terminal "192.168.0.2" associated with the user. Note that if the user is in possession of three or more user terminals, a request to retract the authorization confirmation is made for all of the user terminals aside from the user terminal for which the authorization operation was performed. Additionally, regardless of whether the user has accepted or rejected the authorization through the authorization operation, a request is made to retract the authorization confirmation for the user terminals aside from the predetermined user terminal. As a result, if the user performs the authorization operation for the current authorization request, they will no longer end up mistakenly performing the authorization operation for the same authorization request through another user terminal.

In this manner, when the authorization server 151 receives permission from the owner of a specified resource in response to an authorization start request from the client 111, that permission can be stored along with the identifier of the owner of the resource in association with the identifier of the client 111.

Figure 4D:
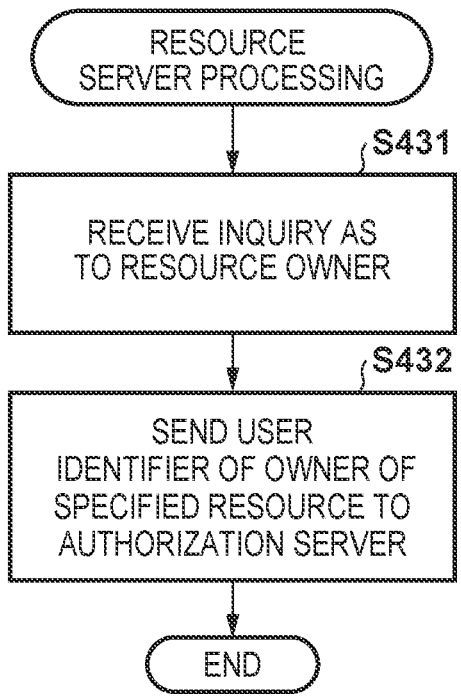
FIG. 4D is a flowchart for describing processing performed when the resource server returns a resource owner to the authorization server, according to the first embodiment.

FIG. 4D is a flowchart for describing processing performed when the resource server 152 returns a resource owner to the authorization server 151, according to the first embodiment. The processing described in this flowchart is started in response to the resource server 152 receiving an inquiry as to the resource owner from the authorization server 151. Note that the processing described in this flowchart is realized by a CPU of the resource server 152 deploying a program in RAM and executing the program so as to function as the resource management module 371.

In step S431, the resource management module 371 receives the inquiry as to the resource owner from the authorization server 151. The inquiry includes an identifier of the resource. The processing then advances to step S432, where the resource management module 371 obtains the user identifier of the owner of the specified resource and sends the user identifier to the authorization server 151, after which this processing ends.

FIG. 14A is a diagram illustrating an example of a resource management table managed by the resource management module 371.

In FIG. 14A, the resource identifier is employed as identification information for identifying the resource, and indicates that the identifier of the owner of the resource indicated by the resource identifier "/datalake/iot0010/data" is the user identifier "user_abcde".

FIG. 5A is a flowchart for describing processing performed when the authorization server 151 makes an authorization completion notification to the client 111, according to the first embodiment. The processing described in this flowchart is started upon the authorization result being stored in step S426 of FIG. 4C. Note that the processing described in this flowchart is realized by the CPU 201 of the authorization server 151 deploying a program in the RAM 202 and executing the program.

In step S501, functioning as the authorization confirmation module 354, the CPU 201 obtains the authorization request identifier stored in step S426. The processing then advances to step S502, where functioning as the authorization confirmation module 354, the CPU 201 obtains a client end point, which is information indicating a connection destination of the client, associated with the authorization request identifier obtained in step S501.

FIG. 14B is a diagram illustrating an example of a client management table, which manages the correspondence relationships between the client identifiers and client end points held in the authorization server 151, according to the first embodiment.

In FIG. 14B, it can be seen that the client end point for a client identifier "client_xyz" is "10.0.0.1".

The processing then advances to step S503, where functioning as the authorization confirmation module 354, the CPU 201 permits user access to the resource, i.e., makes a notification of the authorization, to the client end point obtained in step S502, after which this processing ends. Note that the content communicated to the client end point here may be the authorization request identifier obtained in step S501, or may be the access token issued in correspondence with the user authorization. When issuing the access token, processing such as that illustrated in FIG. 5C (described later) is executed.

FIG. 5B is a flowchart for describing processing performed when the client 111 makes an access token request to the authorization server 151, according to the first embodiment. The processing described in this flowchart is started upon the client 111 receiving the authorization completion notification from the authorization server 151 in step S503. Alternatively, this processing may be executed by the client 111 periodically. Note that the processing described in this flowchart is realized by the CPU of the client 111 executing a program deployed in the RAM so as to function as the access token request module 302 or the access token management module 303.

In step S511, the access token request module 302 determines the authorization request identifier for which the access token request is to be made. Here, if this processing is executed periodically, the authorization request identifier is selected from identifiers, in the authorization request management table illustrated in FIG. 13B, for which access tokens have not yet been obtained. On the other hand, if this processing is started in response to the notification from the authorization server 151, the authorization request identifier included in the notification from the authorization server 151 is used.

The processing then advances to step S512, where the access token request module 302 specifies the authorization request identifier determined in step S511 and makes the access token request to the authorization server 151. The processing then advances to step S513, where the access token management module 303 stores the access token received from the authorization server 151 as a response to the request made in step S512, after which the processing ends. FIG. 13B illustrates a situation where an access token "actk111222333", successfully obtained for the authorization request identifier "auth_req_id_98765", is stored.

FIG. 5C is a flowchart for describing processing performed when the authorization server 151 issues an access token, according to the first embodiment. The processing described in this flowchart is started in response to the authorization server 151 having received an access token request from the client 111. Note that the processing described in this flowchart is realized by the CPU 201 of the authorization server 151 deploying a program in the RAM 202 and executing the program.

In step S521, functioning as the access token issuance module 355, the CPU 201 obtains the authorization request identifier from the access token request received from the client 111. The processing then advances to step S522, where functioning as the access token issuance module 355, the CPU 201 determines whether or not an access token can be issued. This processing will be described later with reference to the flowchart in FIG. 5D. The processing then advances to step S523, where functioning as the access token issuance module 355, the CPU 201 determines whether or not it has been determined that an access token can be issued, on the basis of the result of the determination made in step S522. If it is determined that an access token can be issued, the processing advances to step S524. If, however, it is determined that an access token cannot be issued, the processing advances to step S525. In step S524, functioning as the access token issuance module 355, the CPU 201 issues an access token corresponding to the user identifier and scope associated with the authorization request identifier obtained in step S521, and returns the issued access token to the client 111, after which this processing ends.

FIG. 14C is a diagram illustrating an example of an access token management table which manages the access tokens issued by the access token issuance module 355. Note that this access token management table is stored in, for example, the external memory 211 of the authorization server 151.

FIG. 14C illustrates a situation where an access token, which indicates that the user "user_abcde" who is the owner of the resource has transferred authority according to the scope "get-data", has been issued with an access token identifier "actk111222333". Note that the access token returned to the client 111 in step S524 may be only the access token identifier, or may be data structured so as to include the user identifier and the scope in addition to the access token identifier. In step S525, functioning as the access token issuance module 355, the CPU 201 notifies the client 111 that the access token cannot be issued, after which this processing ends.

Figure 5D:
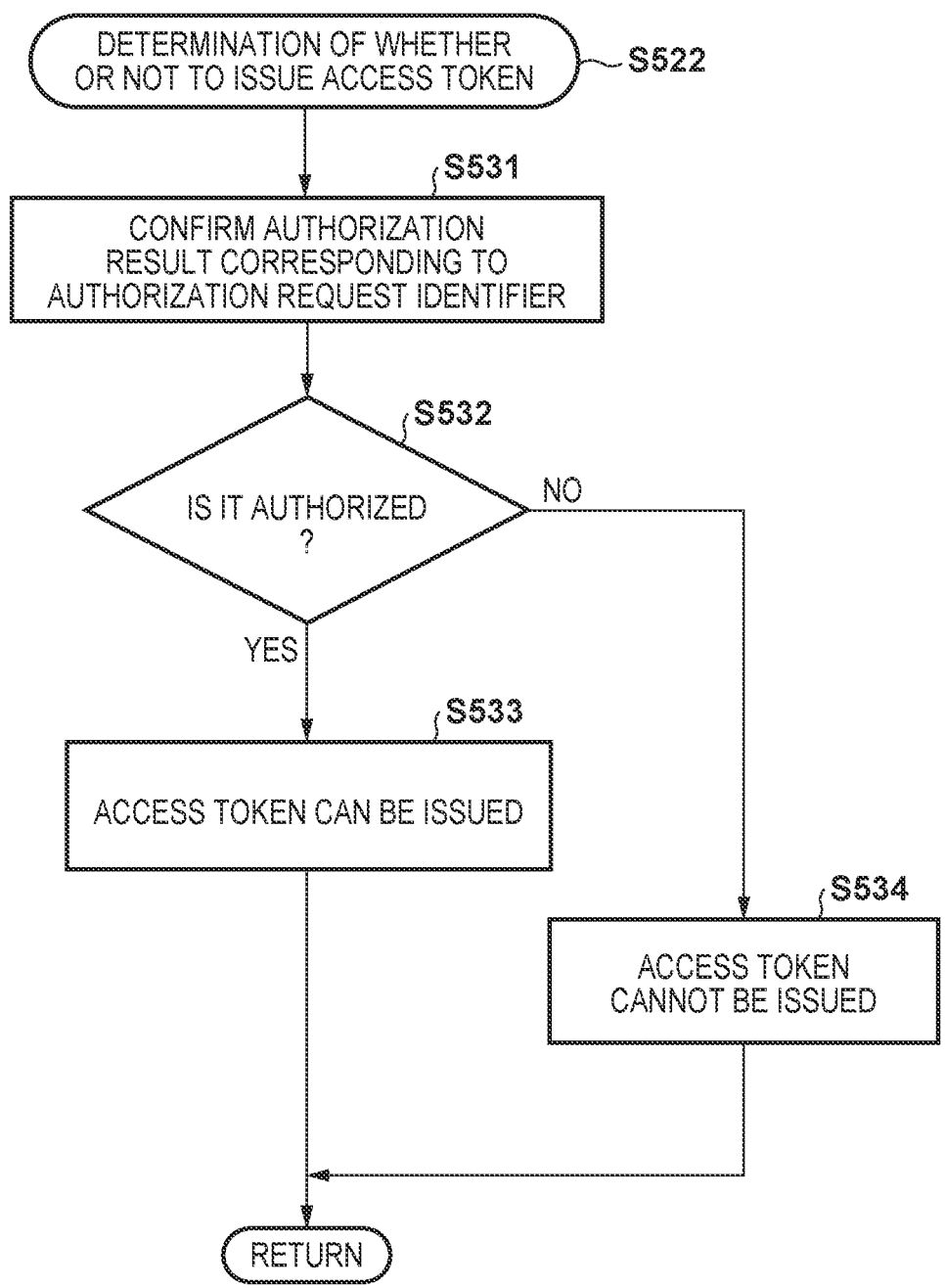
FIG. 5D is a flowchart for describing processing for determining whether or not an access token can be issued, performed in step S522.

FIG. 5D is a flowchart for describing the processing for determining whether or not an access token can be issued, performed in step S522.

In step S531, functioning as the access token issuance module 355, the CPU 201 refers to the authorization confirmation status management table illustrated in FIG. 13C and confirms the authorization result corresponding to the specified authorization request identifier. The processing then advances to step S532, where functioning as the access token issuance module 355, the CPU 201 determines whether or not the authorization result confirmed in step S531 indicates a successful authorization. If so, the processing advances to step S533, and if not, the processing advances to step S534. In step S533, functioning as the access token issuance module 355, the CPU 201 determines that the access token can be issued, after which this processing ends. On the other hand, in step S534, functioning as the access token issuance module 355, the CPU 201 determines that the access token cannot be issued, after which this processing ends.

FIG. 6 is a diagram for describing an overall flow from when the client 111 makes the authorization start request to the authorization server 151 to when the client 111 obtains an access token and accesses the resource, according to the first embodiment.

In S601, the client 111 makes an authorization start request to the authorization server 151. In S602, the client 111 obtains an authorization request identifier in response. S601 corresponds to step S401 and step S411 in FIGS. 4A and 4B, and S602 corresponds to step S402 and step S416 in FIGS. 4A and 4B.

Upon receiving this authorization start request, in S603, the authorization server 151 makes an inquiry regarding the resource owner to the resource server 152 in order to determine the resource owner corresponding to the resource identifier included in the authorization start request. In S604, the user identifier of the resource owner is received as a response to that inquiry. S603 corresponds to step S412 and step S431 in FIGS. 4B and 4D, and S604 corresponds to step S413 and step S432 in FIGS. 4B and 4D.

Then, once the resource owner has been determined, in S605, the authorization server 151 makes an authorization confirmation request to the user terminal 171 associated with the resource owner. As a result, the authorization confirmation screen 701 illustrated in FIG. 7 is displayed in the user terminal 171, and the user performs the authorization operation for one of the user terminals.

FIG. 7 is a diagram illustrating an example of the authorization confirmation screen 701 displayed in the user terminal 171 according to the first embodiment.

The user performs the authorization operation through this authorization confirmation screen 701 by selecting "allow" in the authorization confirmation screen 701 when authorizing the client to access the user resources, and selecting "reject" when rejecting this authorization. The result of the authorization operation performed by the user is returned to the authorization server 151 in S606. S605 corresponds to step S424 in FIG. 4C, and S606 corresponds to step S425 in FIG. 4C.

Upon receiving the authorization result in S606, in S607, the authorization server 151 sends an authorization confirmation retraction request to all the user terminals which are in the user's possession and which are not the user terminal 171 for which the user performed the authorization operation in S607. The user terminals which have received the authorization confirmation retraction request stop displaying the authorization confirmation screen 701 which is currently displayed. The authorization completion notification is then sent to the client 111 in S608. S608 corresponds to step S503 in FIG. 5A.

The client 111 receives the authorization completion notification in S608, or periodically makes an access token request to the authorization server 151 in S609. The access token is received as a response in S610. S609 corresponds to step S512 and step S521 in FIGS. 5B and 5C, and S610 corresponds to step S513 and step S524 in FIGS. 5B and 5C. Thus the client 111 which has received the access token in S608 or S610 accesses the resource in the resource server 152 in S611, and obtains the resource from the resource server 152 as a response in S612.

Figure 9A:
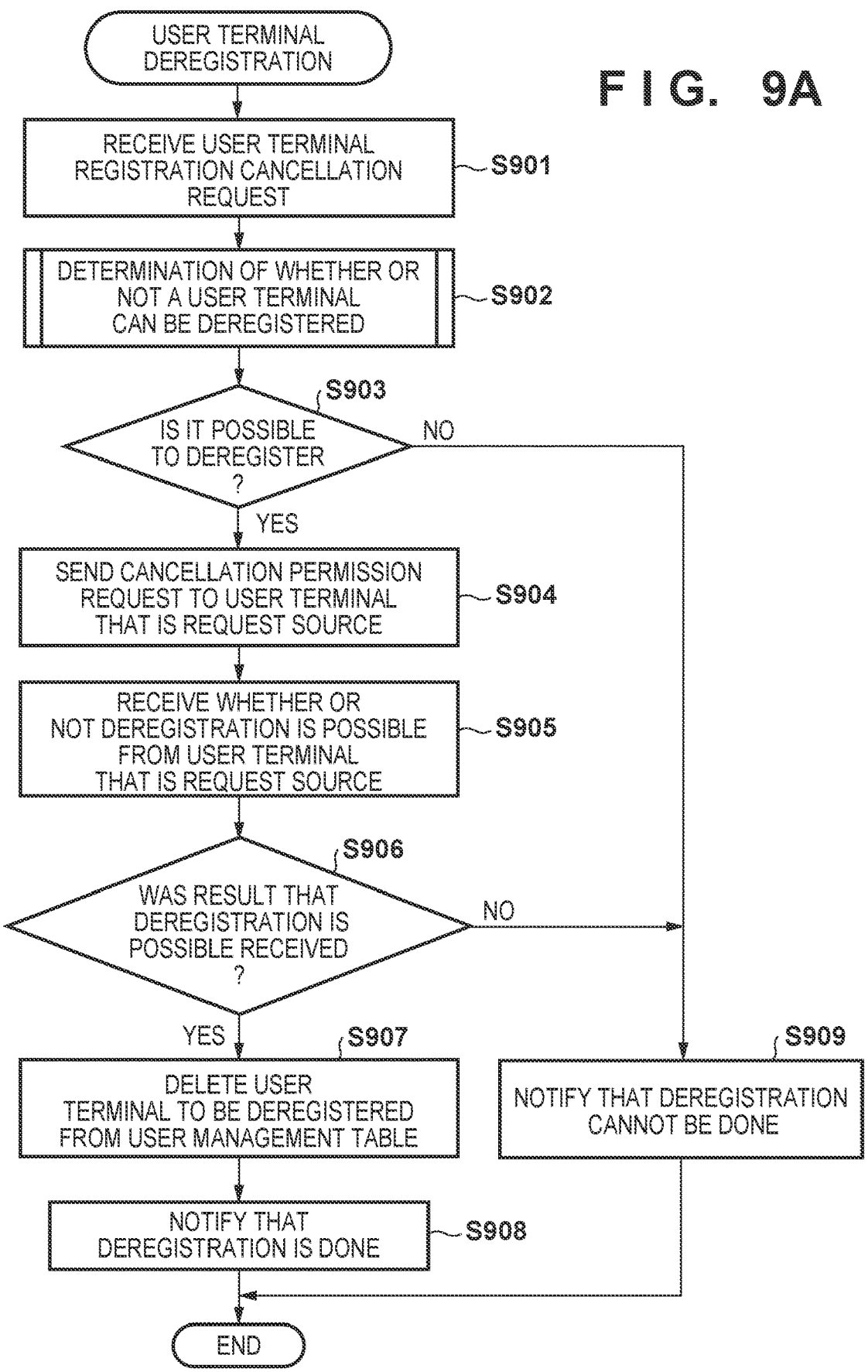
FIG. 9A is a flowchart for describing processing performed when the authorization server deregisters a user terminal, according to the first embodiment.

FIG. 9A is a flowchart for describing processing performed when the authorization server 151 deregisters the user terminal 171, according to the first embodiment. The processing described in this flowchart is started upon the authorization server 151 receiving a user terminal registration cancellation request from the user terminal 171. Note that the processing described in this flowchart is realized by the CPU 201 of the authorization server 151 deploying a program in the RAM 202 and executing the program so as to function as the user terminal management module 351.

In step S901, the CPU 201 receives the user terminal registration cancellation request from the user terminal 171. This registration cancellation request includes the identifier of the user terminal 171 that sent the request, and the identifier of the user terminal 172 to be deregistered. Note that although the first embodiment describes a method of deregistering a single user terminal, registration cancellation requests may be made for a plurality of user terminals registered in the authorization server 151. When the identifier of the user terminal 171 is specified as the user terminal which sent the request, and the identifiers of the user terminal 171 and the user terminal 172 are specified as the user terminals to be deregistered, the user terminal 171 and the user terminal 172 are deregistered. Additionally, when the identifier of the user terminal 171 is included as the user terminal which sent the request, all of the user terminals in the possession of the user who owns the user terminal 171 may be specified as user terminals to be deregistered.

The processing then advances to step S902, where the CPU 201 determines whether or not the user terminal can be deregistered on the basis of the information in the request received in step S901. This processing will be described later with reference to the flowchart in FIG. 9B. The processing then advances to step S903, where the CPU 201 determines, on the basis of the result of step S902, whether the user terminal can be deregistered. If it is determined that the user terminal can be deregistered, the processing advances to step S904, whereas if it is determined that the user terminal cannot be deregistered, the processing advances to step S909. In step S904, the CPU 201 sends a user terminal registration cancellation confirmation request of the user terminal 172 to the user terminal 171. The processing then advances to step S905, where functioning as the user terminal management module 351, the CPU 201 receives a result of the user terminal registration cancellation confirmation request, sent in step S904, from the user terminal 171. The processing then advances to step S906, where functioning as the user terminal management module 351, the CPU 201 determines whether the user terminal is permitted to be deregistered, as a result of step S905. If it is determined that the cancellation has been permitted, the processing advances to step S907, whereas if it is determined that the cancellation has been rejected, the processing advances to step S909. In step S907, the CPU 201 deletes the information of the user terminal 172 from the user management table (see FIG. 13A). The processing then advances to step S908, where the CPU 201 notifies the user terminal 171 that the information of the user terminal 172 has been deleted from the authorization server 151, after which this processing ends. On the other hand, in step S909, the CPU 201 notifies the user terminal 171 that the user terminal 172 will not be deregistered, after which this processing ends.

Figure 9B:
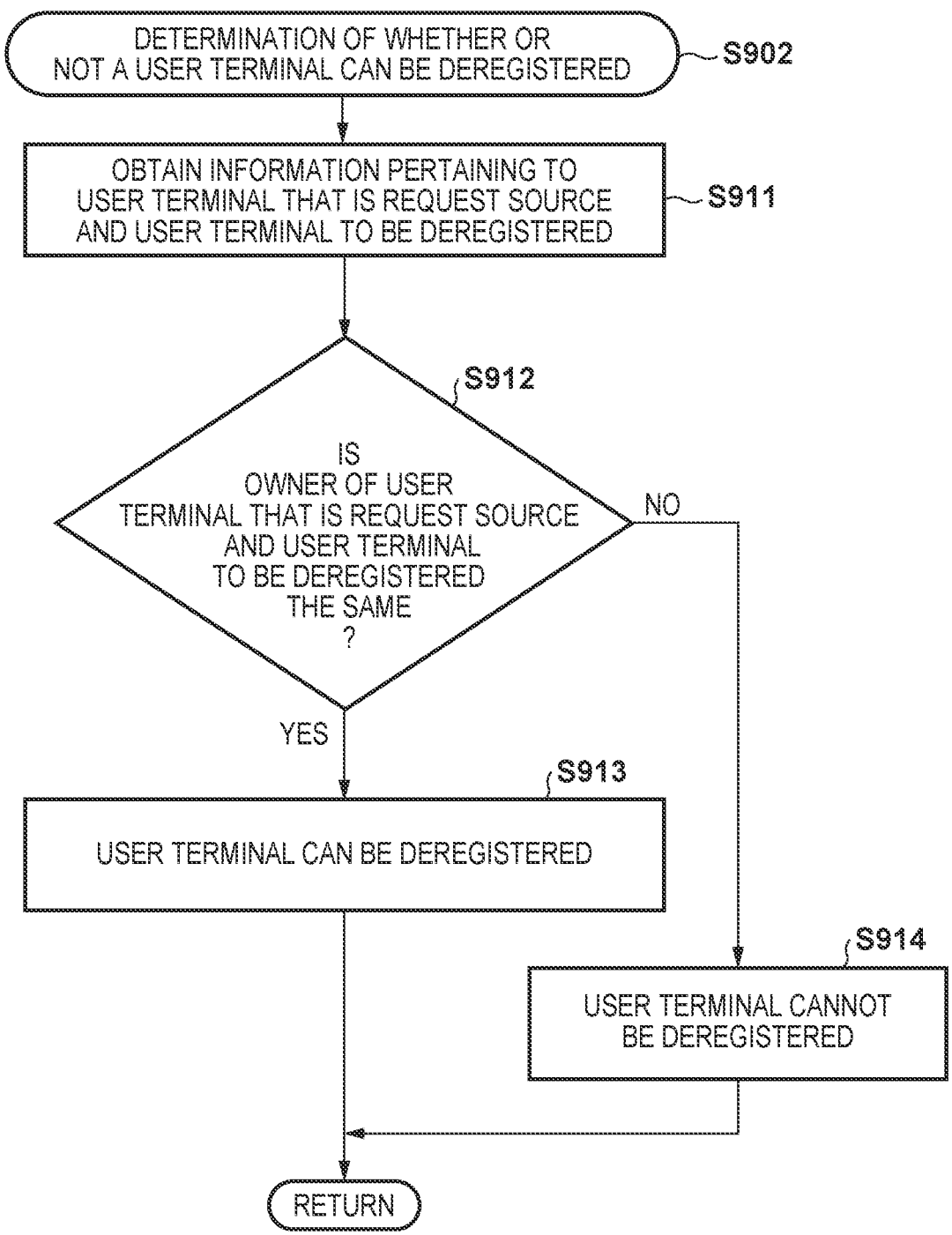
FIG. 9B is a flowchart for describing processing performed when determining whether or not a user terminal can be deregistered, performed in step S902.

FIG. 9B is a flowchart for describing processing performed when determining whether or not a user terminal can be deregistered, performed in step S902.

In step S911, the CPU 201 obtains information pertaining to the terminal which sent the user terminal registration cancellation request and the user terminal to be deregistered, i.e., information pertaining to the user terminal 171 and the user terminal 172, from the user management table. The processing then advances to step S912, where on the basis of the information of the user terminal 171 and the user terminal 172 obtained in step S911, the CPU 201 determines whether or not the owners of the two user terminals are the same owner. If the owners are the same user, the processing advances to step S913, and if not, the processing advances to step S914. In step S913, the CPU 201 determines that the user terminal 172 can be deregistered, and this processing then ends. On the other hand, in step S914, the CPU 201 determines that the user terminal 172 cannot be deregistered, and this processing then ends.

As described thus far, according to the first embodiment, a user terminal can be deregistered even if the user cannot operate the user terminal to be deregistered. In other words, instead of operating the user terminal to be deregistered and canceling the registration, a registration cancellation request is made from a different registered user terminal, and thus that user terminal can be deregistered.

Second Embodiment

In the foregoing first embodiment, in the user terminal registration cancellation processing described in FIGS. 9A and 9B, the user terminal is deregistered by including the information of the user terminal to be deregistered in the user terminal registration cancellation request. In the first embodiment, the user's credential information is entered when registering the user terminal with the authorization server 151, but no request is made to have the credential information entered when deregistering the user terminal. As opposed to this, a second embodiment will describe an example in which in the user terminal registration cancellation processing, a request is made for the credential information of the user terminal to be deregistered, so that the user terminal is deregistered in a safer manner. Note that the system configuration, the hardware configuration of the client, the authorization server, and the user terminals, and so on according to the second embodiment are the same as those described above in the first embodiment, and will therefore not be described.

Figure 10:
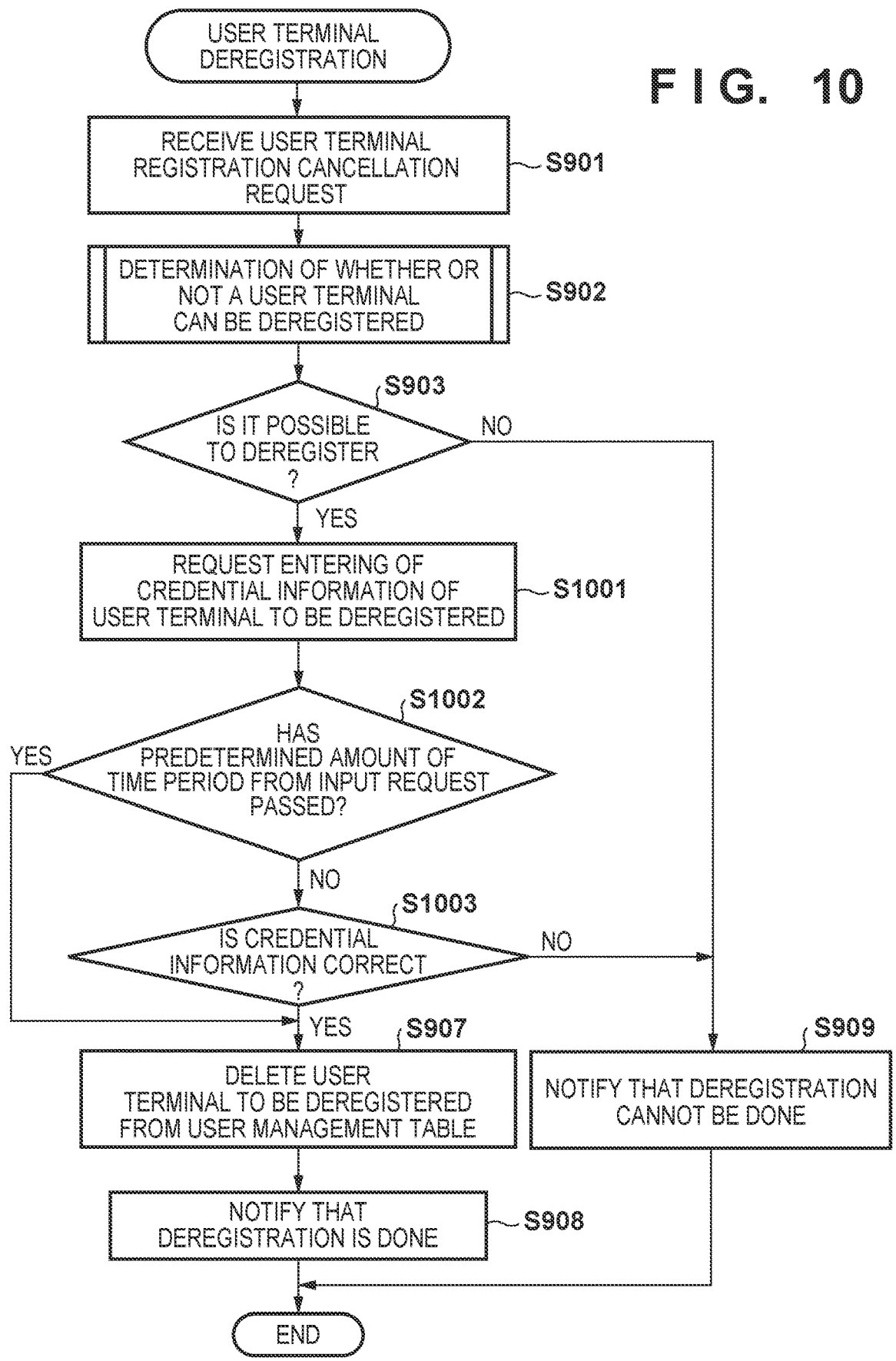
FIG. 10 is a flowchart for describing processing performed when the authorization server deregisters a user terminal, according to a second embodiment.

FIG. 10 is a flowchart for describing processing performed when the authorization server 151 deregisters the user terminal 172, according to the second embodiment. The processing described in this flowchart is started upon the user terminal management module 351 of the authorization server 151 receiving a user terminal registration cancellation request from the user terminal 171. Note that in FIG. 10, processes which are the same as in the aforementioned FIG. 9A are given the same reference signs, and will not be described here. Note that the processing described in this flowchart is realized by the CPU 201 of the authorization server 151 deploying a program in the RAM 202 and executing the program so as to function as the user terminal management module 351.

In step S903, the CPU 201 determines, as a result of step S902, whether the user terminal can be deregistered, and if it is determined that the user terminal in question can be deregistered, the processing advances to step S1001. On the other hand, if it is determined that the user terminal cannot be deregistered, the processing advances to step S909, and the flow ends after the process of step S909.

In step S1001, the CPU 201 makes a request, to the user terminal 172 to be deregistered, for the owner of that user terminal to enter their credential information. The processing then advances to step S1002, where the CPU 201 measures the time from when the request to enter the credential information was started, and determines whether or not a predetermined amount of time period has passed. Here, if the predetermined amount of time period has not passed, the processing advances to step S1003, but if the predetermined amount of time period has passed, the processing advances to step S907, where the user terminal to be deregistered is deleted from the user management table without waiting for the credential information to be entered. Note that the predetermined amount of time may be a time set in advance in the user terminal management module 351, or may be designated within the user terminal registration cancellation request.

In step S1003, the CPU 201 determines whether or not the credential information received in step S1001 matches the credential information of the owner of the user terminal 172 to be deregistered. Here, if the credential information matches, i.e., if the owner of the user terminal 172 is successfully authenticated, the processing advances to step S907, where the user terminal to be deregistered is deleted from the user management table. On the other hand, if the credential information does not match, the processing advances to step S909, where the CPU 201 notifies the user terminal 171 that the user terminal 172 will not be deregistered, after which this processing ends.

As described thus far, according to the second embodiment, even if an unauthorized third party has sent a user terminal registration cancellation request, the request is verified using authentication information of the user terminal to be deregistered, which makes it possible to reduce situations where a user terminal is deregistered by an unauthorized third party. Furthermore, even if the user terminal to be deregistered has been obtained by an unauthorized third party, the third party cannot enter the credential information of the user terminal, which makes it possible to prevent that user terminal from being deregistered.

Third Embodiment

In the user terminal registration cancellation processing according to the second embodiment, a request for the owner to enter their credential information is made to the user terminal to be deregistered, and the user terminal is not deregistered if authentication using that credential information fails. However, if a third party has sent an unauthorized user terminal registration cancellation request, and a predetermined amount of time period has passed without the owner noticing that a notification has arrived at the user terminal to be deregistered, the user terminal may be deregistered against the owner's intentions.

Accordingly, the third embodiment will describe an example in which a request for the credential information to be entered is made to the user terminal which sent the user terminal registration cancellation request. This ensures that a registration cancellation request which is unintended by the owner is not carried out. Note that the system configuration, the hardware configuration of the client, the authorization server, and the user terminals, and so on according to the third embodiment are the same as those described above in the first embodiment, and will therefore not be described.

Figure 11:
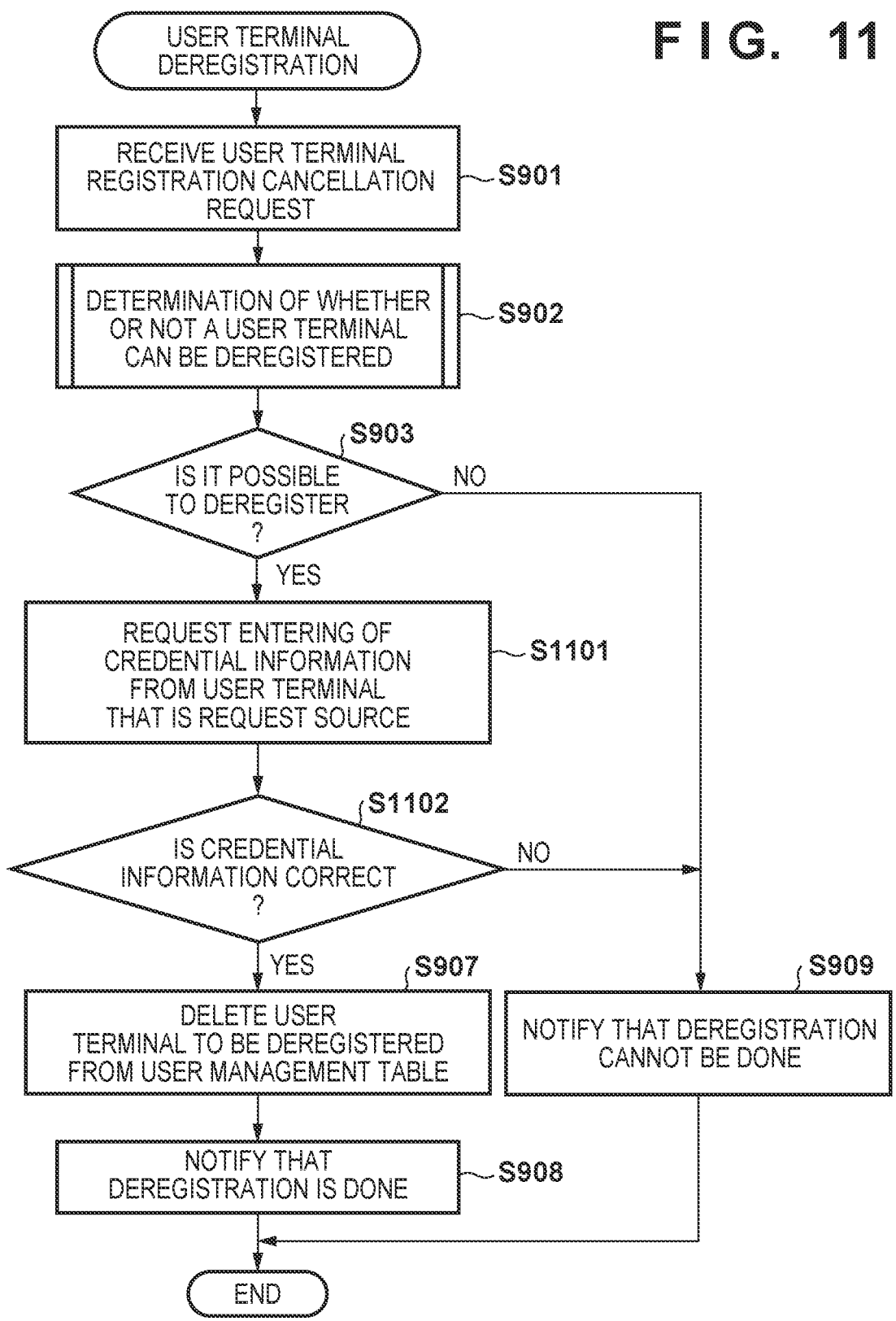
FIG. 11 is a flowchart for describing processing performed when the authorization server deregisters a user terminal, according to a third embodiment.

FIG. 11 is a flowchart for describing processing performed when the authorization server 151 deregisters the user terminal 172, according to the third embodiment. The processing described in this flowchart is started upon the user terminal management module 351 of the authorization server 151 receiving a user terminal registration cancellation request from the user terminal 171. Note that in FIG. 11, processes which are the same as in the aforementioned FIG. 9A are given the same reference signs, and will not be described here. Note that the processing described in this flowchart is realized by the CPU 201 of the authorization server 151 deploying a program in the RAM 202 and executing the program so as to function as the user terminal management module 351.

In step S903, the CPU 201 determines whether the user terminal can be deregistered. Here, if it is determined that the user terminal can be deregistered, the processing advances to step S1101, and if not, the processing advances to step S909. In step S1101, the CPU 201 makes a request to the owner of the user terminal 171 that sent the registration cancellation request to enter their credential information. The processing then advances to step S1102, where the CPU 201 determines whether or not the credential information received in step S1101 matches the credential information of the owner of the user terminal 171. Here, if the credential information matches, the processing advances to step S907, and the user terminal to be deregistered is deleted from the user management table, after which the processing advances to step S908. On the other hand, in step S1102, if the credential information does not match that of the owner of the user terminal 171, the processing advances to step S909.

As described thus far, according to the third embodiment, by making, to a user terminal which sent a user terminal registration cancellation request, a request for the credential information of the owner of that user terminal to be entered, an unauthorized user terminal registration cancellation request can be prevented from being made by a third party. Additionally, by combining the second embodiment with the third embodiment, and making a request for the credential information to both the source of the user terminal registration cancellation request and the user terminal to be deregistered, a more secure system can be implemented.

Fourth Embodiment

If the user has lost a user terminal already registered in the authorization server 151, there is a risk that a third party who has found the user terminal will maliciously perform authorization processing. In this case, it is possible that an unauthorized third party will perform authority transfer operations, processing for issuing an access token, or the like before the user terminal registration cancellation processing is performed. Accordingly, a fourth embodiment will describe an example in which after the user terminal registration cancellation processing is performed as described in the first embodiment or the second embodiment, the deregistered user terminal invalidates the authorization result. Note that the system configuration, the hardware configuration of the client, the authorization server, and the user terminals, and so on according to the fourth embodiment are the same as those described above in the first embodiment, and will therefore not be described.

FIG. 12 is a flowchart for describing processing performed when the authorization server 151 invalidates a specific authorization result after deregistering a user terminal, according to the fourth embodiment. The processing described in this flowchart is started by the authorization server 151 after the user terminal registration cancellation processing described in FIG. 9A, FIG. 10, or the like is complete, and information on the user terminal deregistered in the user terminal registration cancellation processing is exchanged. Note that the processing described in this flowchart is realized by the CPU 201 of the authorization server 151 deploying a program in the RAM 202 and executing the program so as to function as the user terminal management module 351.

In step S1201, the CPU 201 makes a request, to the user terminal 171, for the estimated date/time when the user terminal was lost to be entered, and then receives the entered information. The processing then advances to step S1202, where the CPU 201 obtains information of an authorization request pertaining to the deregistered user terminal from the authorization request information table (FIG. 13D) of the authorization request management module 352. Specifically, authorization request information in which an authorized user terminal attribute in the authorization request information table is the same as the user terminal identifier of the deregistered user terminal is obtained. Here, the processing of steps S1203 and S1204 is repeated for information of each of authorization request states obtained here.

Then, in step S1203, the CPU 201 obtains the date/time information of the authorization operation from the authorization request, and compares the information to the estimated date/time when the user terminal was lost, entered in step S1201. If the estimated date/time when the user terminal was lost is after the date/time of the authorization operation, the processing advances to step S1204. On the other hand, if the estimated date/time when the user terminal was lost is before the date/time of the authorization operation, and authorization request information for which the process of step S1203 has not been performed is present, the processing advances to step S1203, whereas if not, it is determined that all of the authorization request information has been verified, and the processing ends.

In step S1204, the CPU 201 obtains the authorization request identifier from the authorization request information, and selects the corresponding authorization request information from the authorization confirmation status management table (FIG. 13C). If the authorization result is "approved", that result is changed to "disapproved". Then, if there is authorization request information for which the process of step S1203 has not been performed, the processing advances to step S1203, whereas if not, it is determined that all of the authorization request information has been verified, and this processing ends.

As described thus far, according to the fourth embodiment, even if a user has lost their user terminal and third party has maliciously performed an authorization operation using the lost user terminal, a specific authorization request result can be invalidated.

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-202619, filed Nov. 7, 2019, which is hereby incorporated by reference herein in its entirety.

What is claimed is:

1. An authority transfer system comprising a client, a resource server, a server that receives, from the client, an authorization request requesting permission to access to a resource managed by the resource server, and a user terminal possessed by an owner of the resource,
wherein the server includes at least one processor and at least one memory configured to function as:
a first receiving unit that receives an authorization start request from the client;
a specifying unit that, in accordance with the authorization start request being received by the first receiving unit, specifies a registered user terminal that is to serve as a destination of an authorization confirmation request;
an authorizing unit that sends the authorization confirmation request to the specified user terminal and receives a result of an authorization confirmation as a response;
an issuing unit that controls issuing of an access token in accordance with the result of the authorization confirmation, and in a case that the access token has been issued, sends the access token to the client that sent the authorization start request;
a registering unit that registers a first user terminal in accordance with a registration request of the first user terminal being received from the first user terminal;
a determining unit that determines whether or not a second user terminal registered by the registering unit can be deregistered in accordance with a registration cancellation request of the second user terminal being received from the first user terminal;
an authenticating unit that, in a case that the determining unit has determined that the second user terminal can be deregistered, authenticates the first user terminal or the second user terminal; and
a deregistering unit that deregisters the second user terminal in accordance with the authentication by the authenticating unit,
wherein the authenticating unit makes a request for a credential of a user of the second user terminal to the second user terminal, and in a case that the credential obtained in response to the request matches a credential of the user of the second user terminal registered in the registering unit, the authenticating unit determines that the second user terminal has been successfully authenticated.

2. The authority transfer system according to claim 1,
wherein the authenticating unit makes a request for a credential of a user of the first user terminal to the first user terminal, and in a case that the credential obtained in response to the request matches a credential of the user of the first user terminal registered in the registering unit, the authenticating unit determines that the first user terminal has been successfully authenticated.

3. The authority transfer system according to claim 1,
wherein in a case that the first user terminal and the second user terminal have the same owner, the determining unit determines that the second user terminal can be deregistered.

4. The authority transfer system according to claim 1,
wherein the registering unit can register a plurality of user terminals in association with a single user identifier.

5. An authority transfer system comprising a client, a resource server, a server that receives, from the client, an authorization request requesting permission to access to a resource managed by the resource server, and a user terminal possessed by an owner of the resource, wherein the server includes at least one processor and at least one memory configured to function as:
  a first receiving unit that receives an authorization start request from the client
  a specifying unit that, in accordance with the authorization start request being received by the first receiving unit, specifies a registered user terminal that is to serve as a destination of an authorization confirmation request;
  an authorizing unit that sends the authorization confirmation request to the specified user terminal and receives a result of an authorization confirmation as a response;
  an issuing unit that controls issuing of an access token in accordance with the result of the authorization confirmation, and in a case that the access token has been issued, sends the access token to the client that sent the authorization start request
  a registering unit that registers a first user terminal in accordance with a registration request of the first user terminal being received from the first user terminal;
  a determining unit that determines whether or not a second user terminal registered by the registering unit can be deregistered in accordance with a registration cancellation request of the second user terminal being received from the first user terminal;
  an authenticating unit that, in a case that the determining unit has determined that the second user terminal can be deregistered, authenticates the first user terminal or the second user terminal; and
  a deregistering unit that deregisters the second user terminal in accordance with the authentication by the authenticating unit,
  wherein the authenticating unit makes a request for a credential of a user of the second user terminal to the second user terminal, and in a case that the credential cannot be obtained in response to the request within a predetermined amount of time period, the authenticating unit determines that the second user terminal has been authenticated.

6. An authority transfer system comprising a client, a resource server, a server that receives, from the client, an authorization request requesting permission to access to a resource managed by the resource server, and a user terminal possessed by an owner of the resource,
  wherein the server includes at least one processor and at least one memory configured to function as:
  a first receiving unit that receives an authorization start request from the client
  a specifying unit that, in accordance with the authorization start request being received by the first receiving unit, specifies a registered user terminal that is to serve as a destination of an authorization confirmation request
  an authorizing unit that sends the authorization confirmation request to the specified user terminal and receives a result of an authorization confirmation as a response;
  an issuing unit that controls issuing of an access token in accordance with the result of the authorization confirmation, and in a case that the access token has been issued, sends the access token to the client that sent the authorization start request
  a registering unit that registers a first user terminal in accordance with a registration request of the first user terminal being received from the first user terminal;
  a determining unit that determines whether or not a second user terminal registered by the registering unit can be deregistered in accordance with a registration cancellation request of the second user terminal being received from the first user terminal;
  an authenticating unit that, in a case that the determining unit has determined that the second user terminal can be deregistered, authenticates the first user terminal or the second user terminal;
  a deregistering unit that deregisters the second user terminal in accordance with the authentication by the authenticating unit;
  a second receiving unit that, after the second user terminal has been deregistered by the deregistering unit, receives, from the first user terminal, an invalidation request including date/time information; and
  an invalidating unit that obtains an authorization result pertaining to the deregistered second user terminal and invalidates an authorization result from a date/time after the date/time indicated by the date/time information.

7. A server that receives, from a client, an authorization request requesting permission to access a resource managed by a resource server, and sends an authorization confirmation request to a user terminal, the server comprising at least one processor and at least one memory configured to function as:
  a first receiving unit that receives an authorization start request from the client;
  a specifying unit that, in accordance with the authorization start request being received by the first receiving unit, specifies a registered user terminal that is to serve as a destination of an authorization confirmation request;
  an authorizing unit that sends the authorization confirmation request to the specified user terminal and receives a result of an authorization confirmation as a response;
  an issuing unit that controls issuing of an access token in accordance with the result of the authorization confirmation, and in a case that the access token has been issued, sends the access token to the client that sent the authorization start request;
  a registering unit that registers a first user terminal in accordance with a registration request of the first user terminal being received from the first user terminal;
  a determining unit that determines whether or not a second user terminal registered by the registering unit can be deregistered in accordance with a registration cancellation request for the second user terminal being received from the first user terminal;
  an authenticating unit that, in a case that the determining unit has determined that the second user terminal can be deregistered, authenticates the first user terminal or the second user terminal; and
  a deregistering unit that deregisters the second user terminal in accordance with the authentication by the authenticating unit,
  wherein the authenticating unit makes a request for a credential of a user of the second user terminal to the second user terminal, and in a case that the credential obtained in response to the request matches a credential of the user of the second user terminal registered in the registering unit, the authenticating unit determines that the second user terminal has been successfully authenticated.

8. The server according to claim 7,
  wherein the authenticating unit makes a request for a credential of a user of the first user terminal to the first user terminal, and in a case that the credential obtained in response to the request matches a credential of the user of the first user terminal registered in the registering unit, the authenticating unit determines that the first user terminal has been successfully authenticated.

9. The server according to claim 7, wherein in a case that the first user terminal and the second user terminal have the same owner, the determining unit determines that the second user terminal can be deregistered.

10. The server according to claim 7, wherein the registering unit can register a plurality of user terminals in association with a single user identifier.

11. A server that receives, from a client, an authorization request requesting permission to access a resource managed by a resource server, and sends an authorization confirmation request to a user terminal, the server comprising at least one processor and at least one memory configured to function as:
  a first receiving unit that receives an authorization start request from the client
  a specifying unit that, in accordance with the authorization start request being received by the first receiving unit, specifies a registered user terminal that is to serve as a destination of an authorization confirmation request
  an authorizing unit that sends the authorization confirmation request to the specified user terminal and receives a result of an authorization confirmation as a response;
  an issuing unit that controls issuing of an access token in accordance with the result of the authorization confirmation, and in a case that the access token has been issued, sends the access token to the client that sent the authorization start request
  a registering unit that registers a first user terminal in accordance with a registration request of the first user terminal being received from the first user terminal;
  a determining unit that determines whether or not a second user terminal registered by the registering unit can be deregistered in accordance with a registration cancellation request for the second user terminal being received from the first user terminal;
  an authenticating unit that, in a case that the determining unit has determined that the second user terminal can be deregistered, authenticates the first user terminal or the second user terminal; and
  a deregistering unit that deregisters the second user terminal in accordance with the authentication by the authenticating unit,
  wherein the authenticating unit makes a request for a credential of a user of the second user terminal to the second user terminal, and in a case that the credential cannot be obtained in response to the request within a predetermined amount of time period, the authenticating unit determines that the second user terminal has been authenticated.

12. A server that receives, from a client, an authorization request requesting permission to access a resource managed by a resource server, and sends an authorization confirmation request to a user terminal, the server comprising at least one processor and at least one memory configured to function as:
  a first receiving unit that receives an authorization start request from the client
  a specifying unit that, in accordance with the authorization start request being received by the first receiving unit, specifies a registered user terminal that is to serve as a destination of an authorization confirmation request;
  an authorizing unit that sends the authorization confirmation request to the specified user terminal and receives a result of an authorization confirmation as a response;
  an issuing unit that controls issuing of an access token in accordance with the result of the authorization confirmation, and in a case that the access token has been issued, sends the access token to the client that sent the authorization start request;
  a registering unit that registers a first user terminal in accordance with a registration request of the first user terminal being received from the first user terminal;
  a determining unit that determines whether or not a second user terminal registered by the registering unit can be deregistered in accordance with a registration cancellation request for the second user terminal being received from the first user terminal;
  an authenticating unit that, in a case that the determining unit has determined that the second user terminal can be deregistered, authenticates the first user terminal or the second user terminal;
  a deregistering unit that deregisters the second user terminal in accordance with the authentication by the authenticating unit;
  a second receiving unit that, after the second user terminal has been deregistered by the deregistering unit, receives, from a user of the first user terminal, an invalidation request including date/time information; and
  an invalidating unit that obtains an authorization result pertaining to the deregistered second user terminal and invalidates an authorization result from a date/time after the date/time indicated by the date/time information.

13. A method of controlling a server that receives, from a client, an authorization request requesting permission to access a resource managed by a resource server, and sends an authorization confirmation request to a user terminal, the method comprising:
  receiving an authorization start request from the client;
  specifying, in accordance with the authorization start request being received in the receiving, a registered user terminal that is to serve as a destination of an authorization confirmation request;
  sending the authorization confirmation request to the specified user terminal and receiving a result of an authorization confirmation as a response;
  controlling issuing of an access token in accordance with the result of the authorization confirmation, and in a case that the access token has been issued, sending the access token to the client that sent the authorization start request;
  registering a first user terminal in accordance with a registration request of the first user terminal being received from the first user terminal;
  determining whether or not a second user terminal registered in the registering can be deregistered in accordance with a registration cancellation request for the second user terminal being received from the first user terminal;
  in a case that it is determined in the determining that the second user terminal can be deregistered, authenticating the first user terminal or the second user terminal; and
  deregistering the second user terminal in accordance with the authentication in the authenticating,
  wherein, in the authenticating, a request for a credential of a user of the second user terminal is sent to the second user terminal, and in a case that the credential obtained in response to the request matches a credential of the user of the second user terminal registered in the registering, it is determined that the second user terminal has been successfully authenticated.

14. A non-transitory computer-readable storage medium storing a program for causing a processor to execute a method of controlling a server that receives, from a client, an authorization request requesting permission to access a resource managed by a resource server, and sends an authorization confirmation request to a user terminal, the method comprising:

receiving an authorization start request from the client;

specifying, in accordance with the authorization start request being received in the receiving, a registered user terminal that is to serve as a destination of an authorization confirmation request;

sending the authorization confirmation request to the specified user terminal and receiving a result of an authorization confirmation as a response;

controlling issuing of an access token in accordance with the result of the authorization confirmation, and in a case that the access token has been issued, sending the access token to the client that sent the authorization start request;

registering a first user terminal in accordance with a registration request of the first user terminal being received from the first user terminal;

determining whether or not a second user terminal registered in the registering can be deregistered in accordance with a registration cancellation request for the second user terminal being received from the first user terminal;

in a case that it is determined in the determining that the second user terminal can be deregistered, authenticating the first user terminal or the second user terminal; and deregistering the second user terminal in accordance with the authentication in the authenticating, wherein, in the authenticating, a request for a credential of a user of the second user terminal is sent to the second user terminal, and in a case that the credential obtained in response to the request matches a credential of the user of the second user terminal registered in the registering, it is determined that the second user terminal has been successfully authenticated.

* * * * *